US007051046B2

(12) United States Patent
Virag et al.

(10) Patent No.: US 7,051,046 B2
(45) Date of Patent: May 23, 2006

(54) SYSTEM FOR MANAGING ENVIRONMENTAL AUDIT INFORMATION

(75) Inventors: Peter E. Virag, Pottstown, PA (US); Laurence C. Smith, Wayne, PA (US)

(73) Assignee: Roy F. Weston, Inc., West Chester, PA (US)

(*) Notice: Subject to any disclaimer, the term of this patent is extended or adjusted under 35 U.S.C. 154(b) by 434 days.

(21) Appl. No.: 09/920,073

(22) Filed: Aug. 1, 2001

(65) Prior Publication Data

US 2003/0028544 A1 Feb. 6, 2003

(51) Int. Cl.
*G06F 17/00* (2006.01)

(52) U.S. Cl. ........................................ 707/104.1; 707/9
(58) Field of Classification Search ................ 707/1–4, 707/6–10, 100–104.1, 200–205; 705/1–3, 705/30; 709/200–203; 713/200–202; 235/375, 235/379, 380, 382
See application file for complete search history.

(56) References Cited

U.S. PATENT DOCUMENTS

| 5,311,438 | A  | * | 5/1994 | Sellers et al. ................. 700/96 |
| 5,873,069 | A  | * | 2/1999 | Reuhl et al. .................. 705/20 |
| 6,286,098 | B1 | * | 9/2001 | Wenig et al. ................ 713/151 |
| 6,615,258 | B1 | * | 9/2003 | Barry et al. ................. 709/223 |

* cited by examiner

*Primary Examiner*—Greta Robinson
*Assistant Examiner*—Harold E. Dodds, Jr.
(74) *Attorney, Agent, or Firm*—DLA Piper Rudnick Gray Cary US LLP

(57) ABSTRACT

The present invention is directed to a system for managing environmental audit information which includes receiving environmental audit information, accessing a predetermined set of environmental audit protocols, associating the audit information with at least one of the environmental audit protocols to form at least one environmental audit record, and storing the environmental audit record. The system of the present invention may also restrict access to the audit record, such that a quality assurance reviewer may review said audit record and may designate the status of that review, but may not modify the contents of the audit record.

52 Claims, 32 Drawing Sheets

Figure 4(d)

SYSTEM FOR MANAGING ENVIRONMENTAL AUDIT INFORMATION

BACKGROUND OF THE INVENTION

1. Field of the Invention

The present invention relates to a system for managing environmental audit information. More particularly, the present invention relates to a system for managing environmental audit information based upon a set of established safety protocols, which is accessible over an internetworked system.

2. Description of the Prior Art

Environmental Health and Safety (EH&S) and Occupational Health and Safety (OH&S) audits are a critical aspect of an organization's review of its facilities. Such audits are performed with variety of methods which range from paper-based systems that are partially automated (either in a gathering of data and/or the management of the resulting information) to more sophisticated, automated methods. In large part, however, whatever method is used is apt to result in inconsistent documentation, redundant effort, lack of compatibility with existing databases and the potential for lost or inaccurate paperwork.

These audits are important for business and organizations to help insure that they are in compliance with federal, state, and local safety regulations, and to help minimize any potential liability that may arise from accidents occurring on the premises.

These audits are normally conducted by inspectors, who tour the facility and record any potential violations or issues of which they become aware. Typically, this information is recorded on paper sheets, with reference to particular regulations. These individual audit records are then complied into an audit log. As the number of facilities and areas under review increases, the audit log becomes voluminous.

Once the audit is complete, the information in the audit log must be reviewed and cataloged. This process can also take several weeks if not months to complete. Moreover, if mistakes, inaccuracies, or inconsistencies are found in the log, the area or facility may need to be reexamined for clarification. This can add even more time to the review process.

Once the review and cataloging of the log is complete, then one or more reports will be prepared documenting the results of the audit. This again can be a very time consuming process.

A number of systems have been proposed in the prior art for improving the general process of auditing information and compiling the results. For example, U.S. Pat. No. 6,154,753 to McFarland discloses a system for managing documents and conducting business quality modeling. The McFarland patent discloses a completely electronic system for entering information through a system of forms, and producing documentation to ensure compliance with the ISO 9000 quality standard.

Moreover, U.S. Pat. No. 5,864,784 to Brayton, discloses a hand held data collection and monitoring system for nuclear facilities, in which a pen based hand held computer unit has interactive software that allows the user to review maintenance procedures, collect data, compare data with historical trends and limits, and input new information at various collection sites. The system has a means to allow the automatic transfer of the collected data to a main computer base for further review reporting and distribution.

However, the systems of the prior art, such as those disclosed in the McFarland and Brayton patents, have the significant disadvantage in that they do not provide a system in which audit records can be indexed by the specific environmental or safety protocols to which they pertain. They also fail to provide for quality assurance review during the auditing process, which can be conducted remotely via an internetworked system, with the ability to restrict access as between the various inspectors and the quality assurance personnel.

SUMMARY OF THE INVENTION

The system of the present invention provides a complete solution for EH&S and OH&S audits, from the initial capture of data to the final resolution of the audit finding. The use of an automated system, as described in more detail below, improves audit performance, reduces costs of the program and reduces risks through use of a highly documented system that utilizes current technology while significantly reducing paperwork. The present invention facilitates a standard method of data collection, reporting, and tracking of audit findings, and allows this information to be analyzed and managed both locally and remotely. This provides significant advantages in cost reduction, improved quality assurance, overall reduction in audit life cycle time frame (from discovery of a finding to its final resolution) and reduced risk through better management tools and documentation.

The present invention is directed to a system for managing environmental audit information which includes receiving environmental audit information, accessing a predetermined set of environmental audit protocols, associating the audit information with at least one of the environmental audit protocols to form at least one environmental audit record, and storing the environmental audit record. The system of the present invention may also restrict access to the audit record, such that a quality assurance reviewer may review said audit record and may designate the status of that review, but may not modify the contents of the audit record.

BRIEF DESCRIPTION OF THE DRAWINGS

Figure 4D:
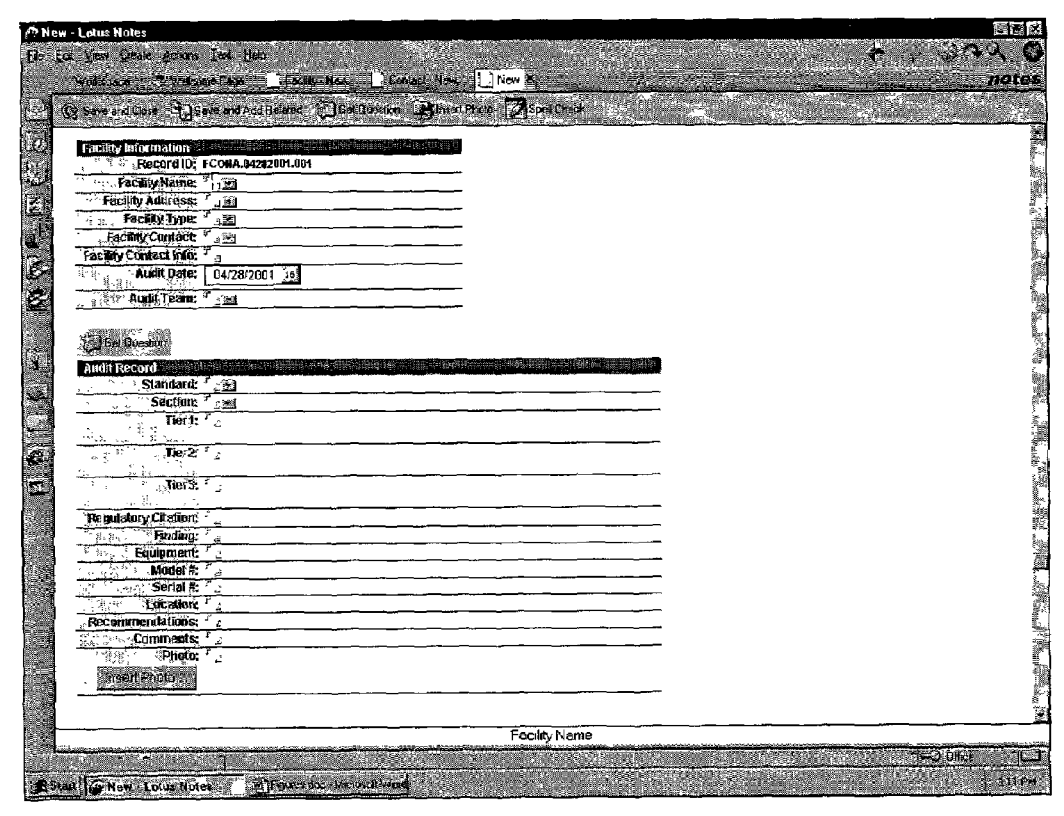

FIGS. 4(a)–(h) are computer screen shots of the preferred embodiment of the field tools of the system of the present invention accessed through the client application.

DETAILED DESCRIPTION OF THE PREFERRED EMBODIMENT

Figure 1:
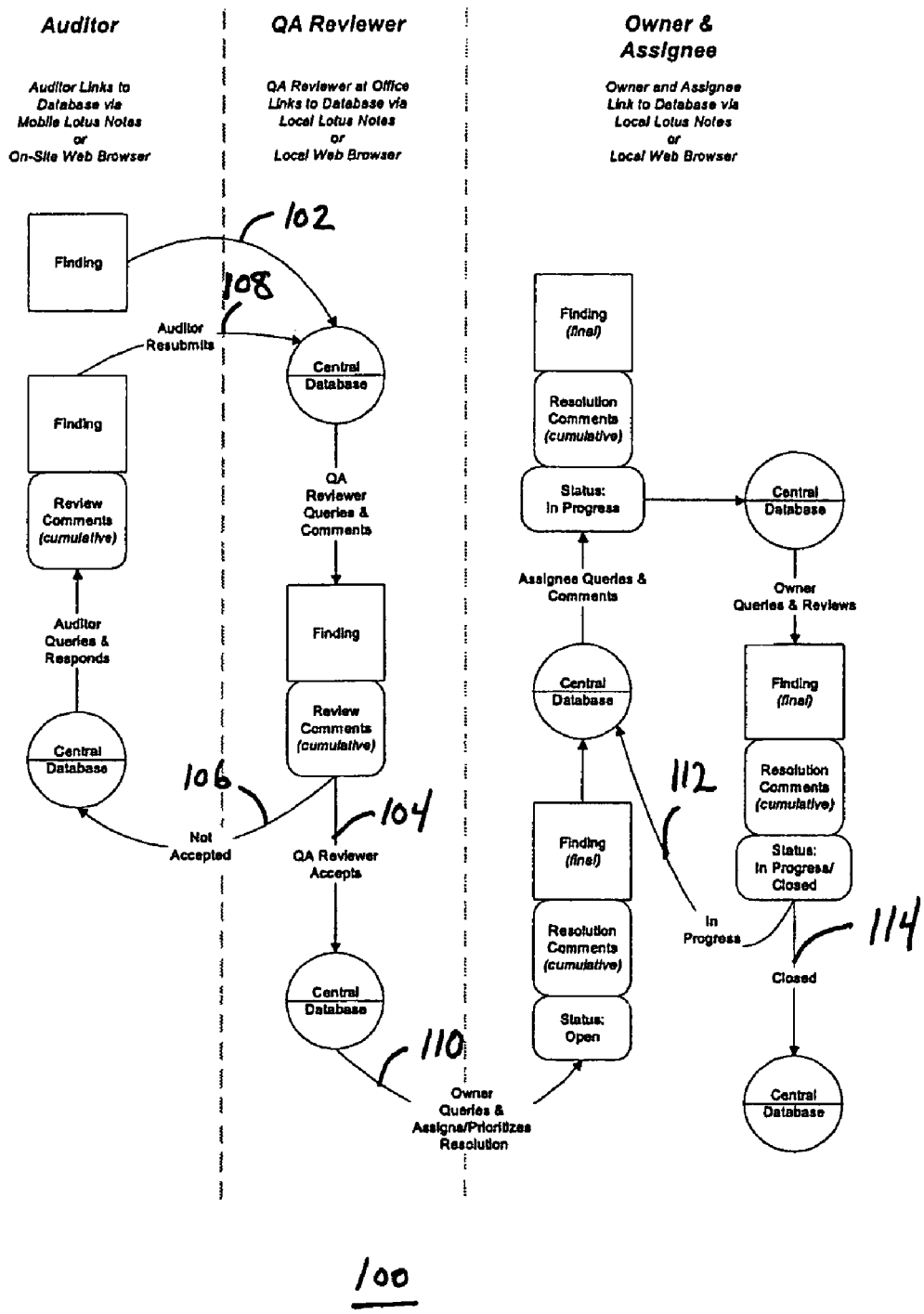
FIG. 1 is a flow chart of a preferred embodiment of the operation of the system of the present invention.

The present invention will be understood more fully from the detailed description given below and from the accompanying drawings of preferred embodiments of the invention, which, however, should not be taken to limit the invention to a specific embodiment, but are for explanation and understanding only.

In its preferred embodiment, the present invention allows audit data to be captured using client software (allowing the user to work independent of a central database). The same functions can also be performed on the central database using a Web browser. This Web functionality may be used over a local intranet connection or through any Internet connection using the latest secure encryption technology to ensure complete data confidentiality and integrity. This functionality allows flexibility with regard to when and how data is captured and managed during the audit process. To prevent conflicts various user groups may be established, each having its own rules and rights concerning the functions, access and views that are granted.

The system of the present invention is programmed to gather and compile electronic data relating to EH&S and OH&S compliance audits. It facilitates the entry of audit information as the audit is being conducted (thereby reducing the need for paper), preferably using a computer for immediate data entry. Alternatively, information can be gathered through traditional methods (paper) and entered into the system at a later time. Once the data is entered into the system the data is immediately available for quality assurance reviews, publication of automated reports (electronic or paper) and information management. The functionality of the present invention allows information to be captured and managed using a client on a PC or through a Web browser. Transfer of data can be accomplished through, but not limited to, hard wire or wireless (wireless networks, cellular phone, satellite etc.) connections to local area networks (LAN), wide area networks (WAN), Intranets or Internet through either direct connection or dial-up. The central database can reside either locally within a LAN or WAN or hosted externally.

An important feature of the present invention is the collection of appropriate and relevant information about each facility being audited and identification of the audit issues. This allows the data to be sorted to aid in correcting the identified issues, in identifying trends, and in managing data and defining metrics.

The system of the present invention includes the several important features.

Data is entered regarding any audited discrepancy with reference to a specific regulatory citation or other defined audit criteria (protocols). This entry contains information specific to a given facility (i.e. name, contacts, address, facility classification, etc.), documentation of discrepancy and any pertinent information relating to that discrepancy (location, equipment type, serial numbers, etc.), digital image(s), classification of findings (i.e. relative to severity, cost impact, etc.), comments and potential corrective actions. All of this information is preferably maintained as part of a single audit record.

Quality assurance is an important part of the present invention. The ability to view findings (either locally or remotely) as soon as the data enters the central database allows the QA reviewer to view all components of the finding including photographs and provides a rapid assessment. All actions and comments relating to the quality assurance process are documented within the finding record indicating the comment, action taken (accept finding, reject finding, etc.), time and date of the action and the person performing the action. The record of the actions is preferably non-editable and maintained as a permanent record within the finding.

Once an audit finding is accepted as a valid finding (based on the QA process) the finding can be addressed and followed to resolution. At this point additional elements are available to be added to the finding record in order to allow the opportunity to manage the finding. These elements include, but are not limited to, assigning a finding to an individual for resolution, assignment of new priority levels, assigning due date, finding status, comments, responses and costs.

The functionality of the database of the present invention allows automated notification based on pre-established criteria with reference to specific elements within the database or actions to specified individuals or user groups. This notification can be communicated by various methods, including e-mail. The content of notification can be, by way of example, notification of past due assignments, changes in finding status, assignment of finding, etc. E-mail notifications have the capability to provide a direct Internet hyperlink directly to the finding in question.

The system of the present invention may integrate off-the-shelf components to facilitate workflow, management and development. Off-the-shelf components include, but are not limited to, computers (desktop, portable, wearable, handheld, etc.), digital cameras (still or video), voice recognition software and hardware and commercial software for application development and database management (i.e. Lotus Notes).

FIG. 1 illustrates the preferred operation of the system of the present invention. The process 100 starts with the auditor discovering a finding and submitting it to the central database 102. At this point the QA reviewer can either accept the finding 104 or reject the finding 106. If the finding is rejected the auditor can provide additional input and/or clarification. The auditor then resubmits the finding for additional QA review 108. Once a finding has been accepted as part of the QA process the finding is then made available to the owner 110. The owner can then assign the finding to the assignee, add comments, change finding status and query and sort the database to facilitate the resolution of findings while the finding status is in progress 112. The assignee has rights to add only certain elements to the finding resolution data fields. Once resolution has been made to a finding only the owner can close the finding 114. All of these functions can be performed through the client or Web browser.

Figure 2:
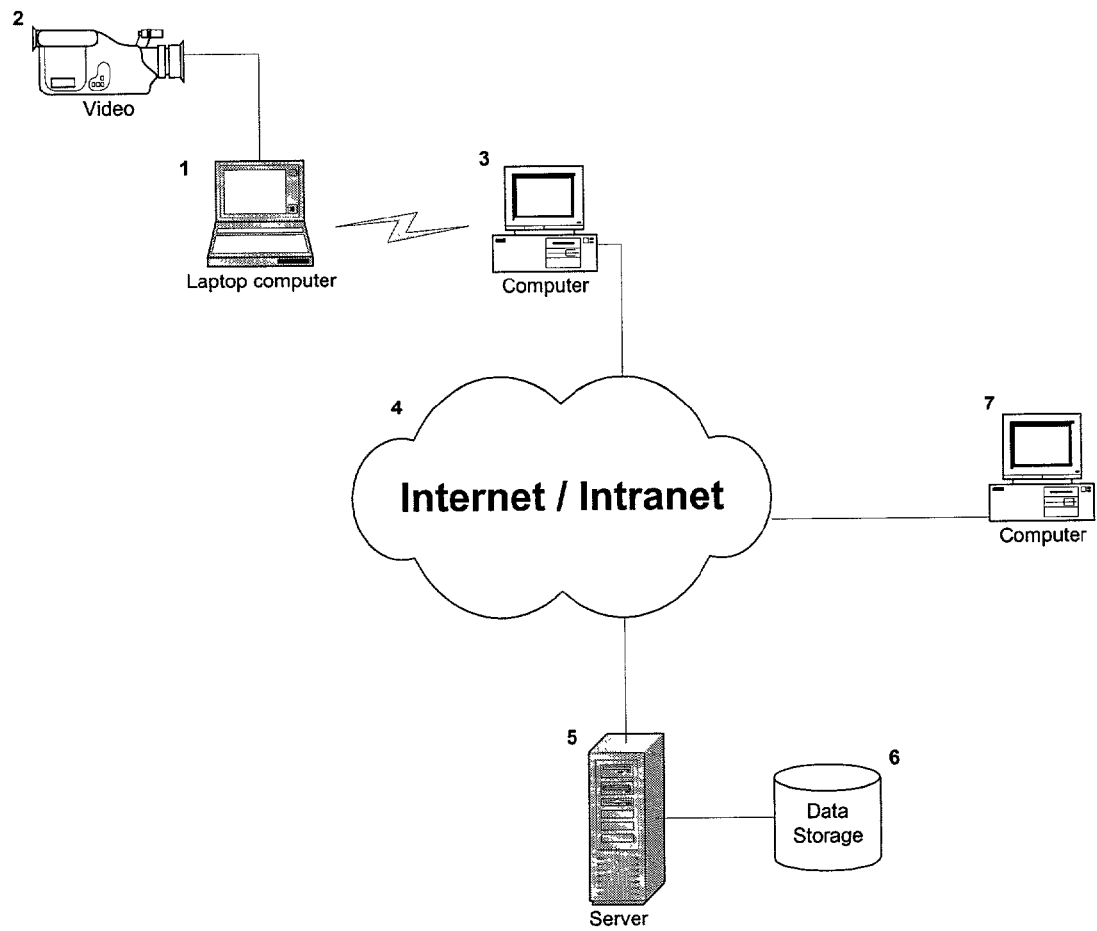
FIG. 2 is a diagram of the preferred embodiment of the system of the present invention operated remotely over a computer network.

A preferred embodiment of the system components of the present invention is shown in FIG. 2. As shown in FIG. 2, a laptop computer 1 (or any mobile input device, such as a PDA or the like) is used by the facility inspector to enter audit information into the system of the present invention. This information may be in the form of text, or may include digital images. Such images could be captured, for example, through the use of video unit 2 (which could also be any other means for obtaining digital images, such as a digital camera, or the like).

Once the inspector has entered the audit information into laptop computer 1, this information is preferably transferred to a computer workstation 3. This may be accomplished through any number of means well known to those of ordinary skill in the art, such as over an Ethernet network, via a wireless network, or via a transportable medium, such as floppy disk or writeable CD-ROM.

Information stored on computer workstation 3 is then preferably uploaded via Internet/intranet 4 to server 5. Internet/intranet 4 may comprise not only the public Internet, but also a closed intranet system, VPN, local network, or the like. The operation of the internet and computer networks are well known to those of ordinary skill in the art and will not be elaborated upon here. Alternatively, the information inputted into laptop computer 1 may be uploaded directly to server 5 without the use of Internet/intranet 4 and computer workstation 3. This may be accomplished in any number of ways well known to those of ordinary skill in the art, for example, through the use of a cell phone uplink, dial-up RAS, direct connection, or the like.

Server 5 then stores the audit information in data storage 6. Data storage 6 is preferably a relational database, although not limited thereto. In the preferred embodiment of the invention discussed herein, data storage 6 is built upon the Lotus Notes platform, but is not limited thereto. Data storage 6 and server 5 are connected to Internet/intranet 4 in a conventional manner, such as via a local computer network, which may include one or more firewalls, routers, and related devices (not shown). The operation of these systems is well known to those of ordinary skill in the art.

The audit information stored in data storage 6 may be accessed through server 5 by the quality assurance inspector using computer 7. Of course, the quality assurance inspector may also access the audit information in data storage 6 through computer 3 or by using the same laptop computer 1 as used by the facility inspector when compiling the information.

In the preferred embodiment of the invention, information is inputted into the system by the facility inspector and reviewed and commented upon by the quality assurance inspector through the use of a client/server software application that includes a series of drill down forms for inputting and extracting the information. In the preferred embodiment of the invention this client/server application is Lotus Notes, as noted above. The client portion of this software preferably operates on laptop computer 1, computer workstation 3, and/or computer 7, whereas the server portion of the software is resident on server 5, controlling access to data storage 6.

The preferred embodiment of the software application used in connection with the system of the present invention will now be described in more detail in regard to FIGS. 2–7.

Figure 3:
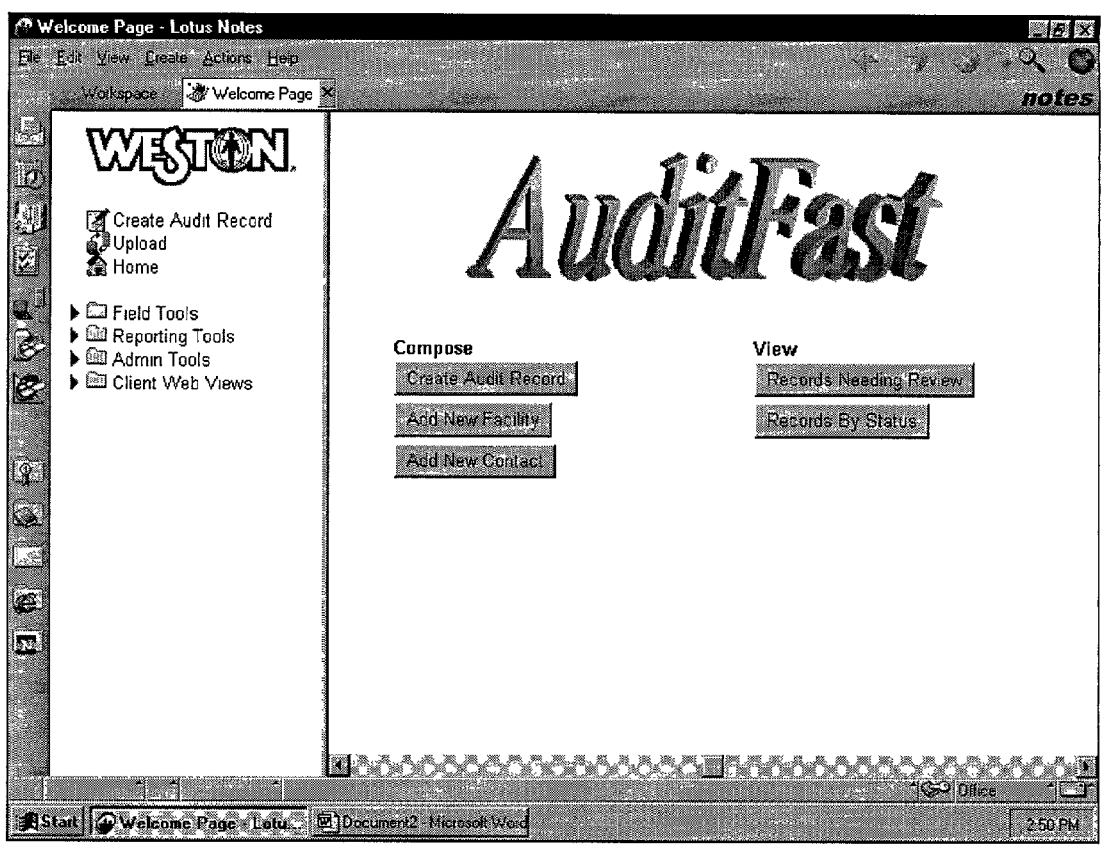
FIG. 3 is a computer screen shot of a preferred embodiment of the home page of the client application of the system of the present invention.
Figure 4A:
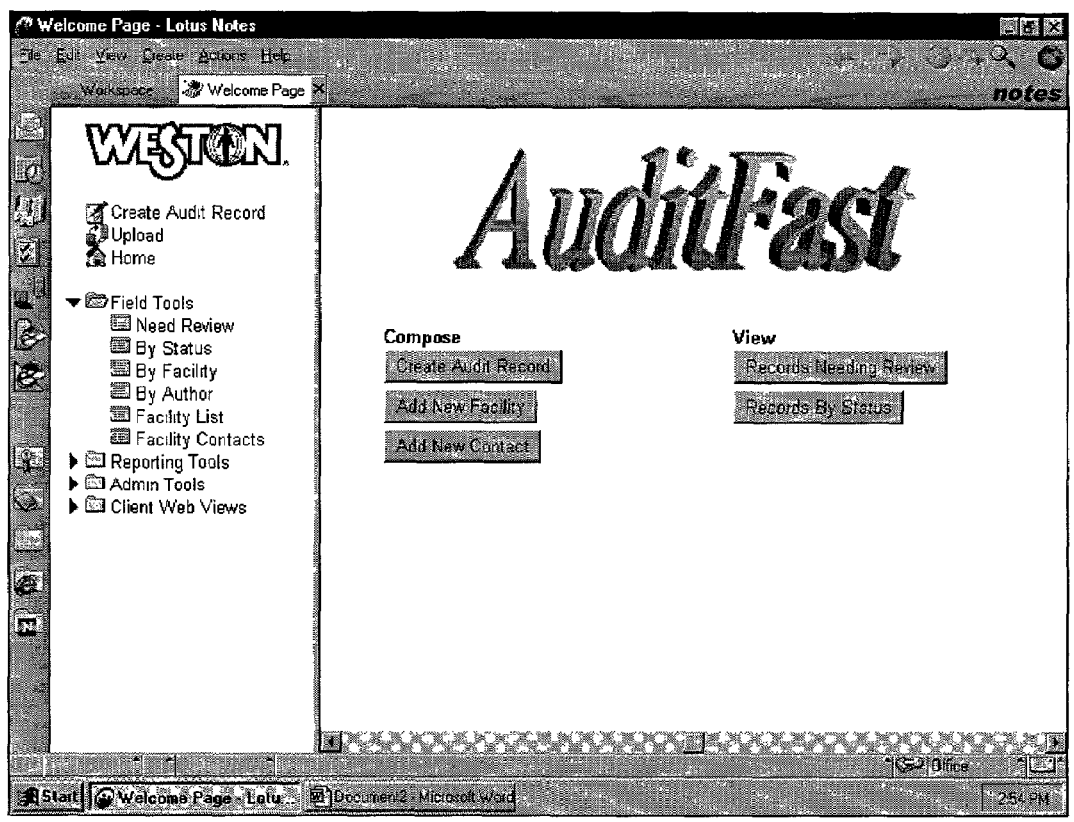
Figure 4B:
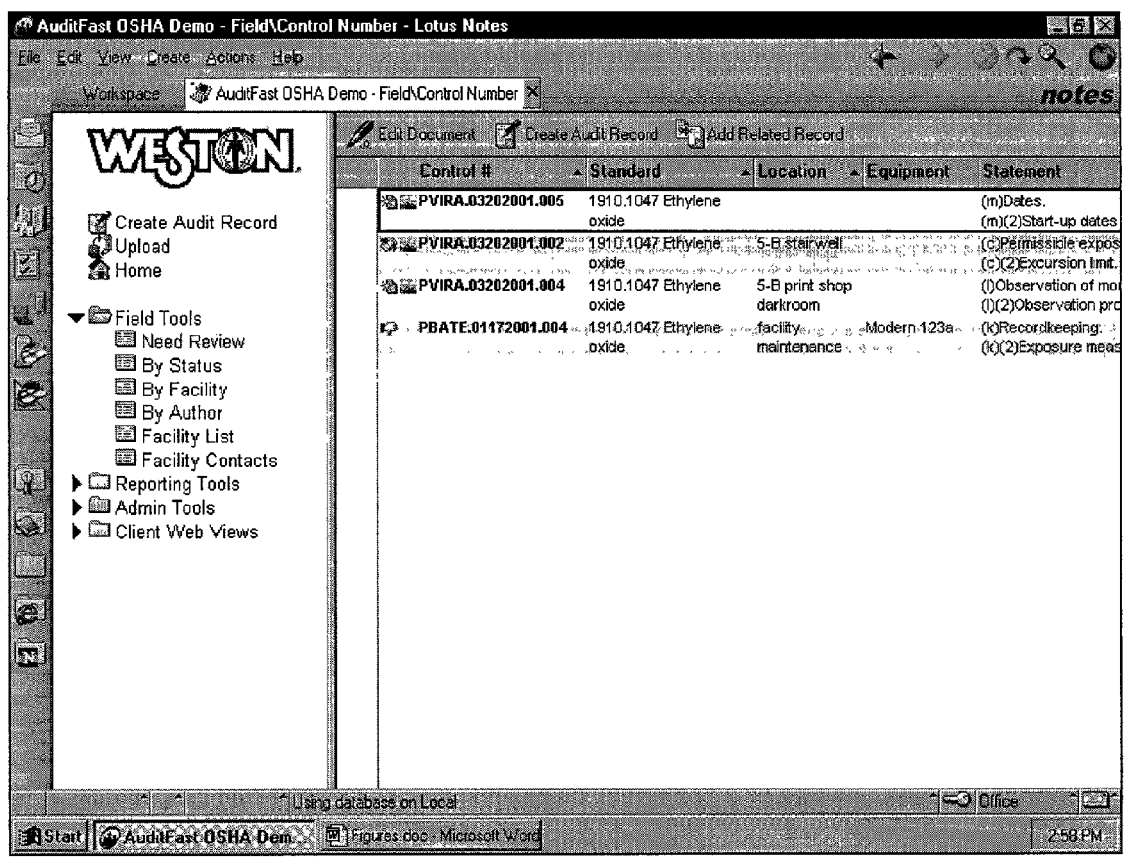
Figure 4C:
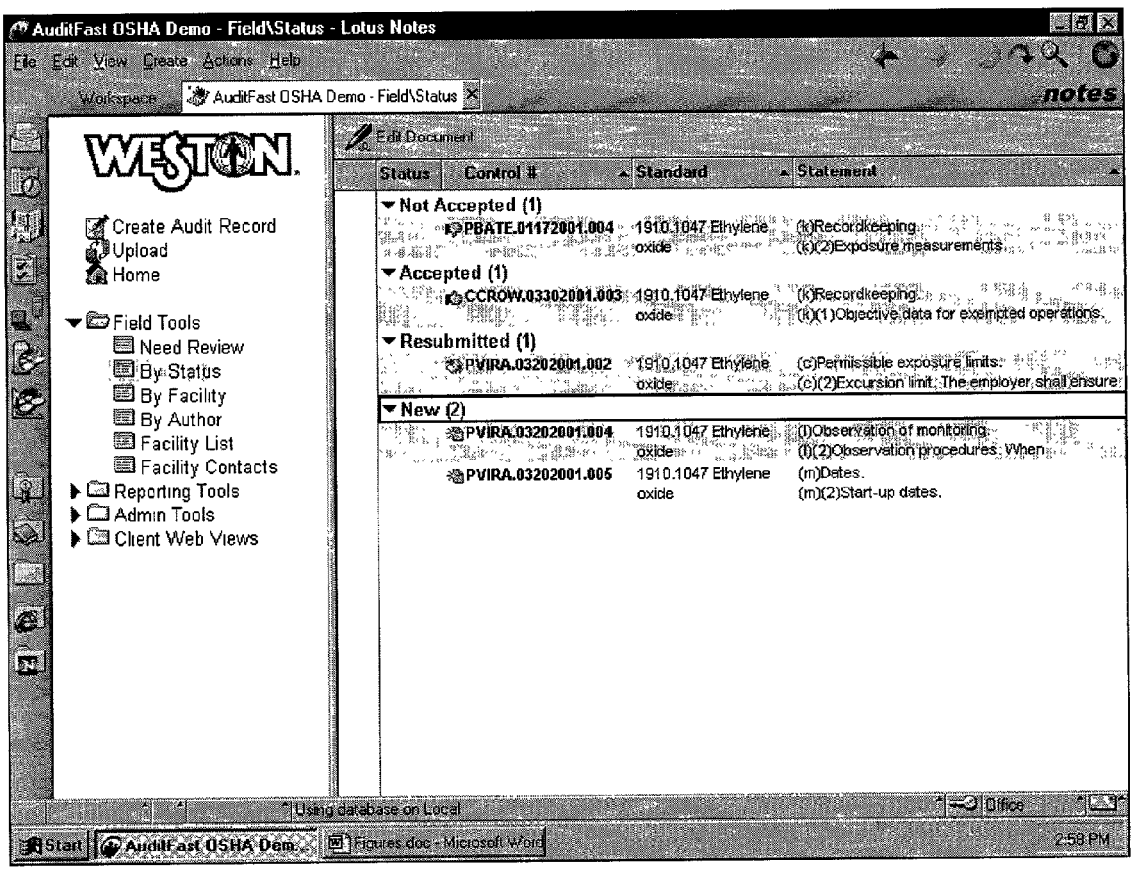
Figure 4E:
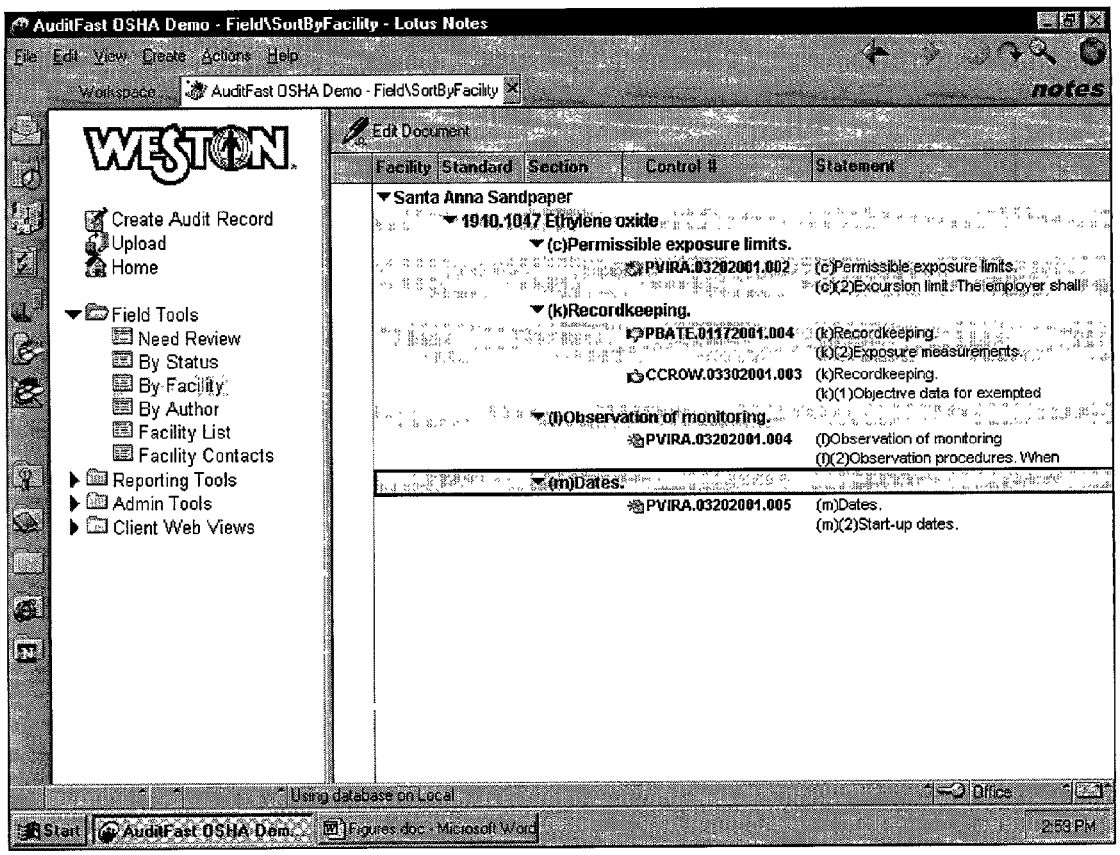
Figure 4F:
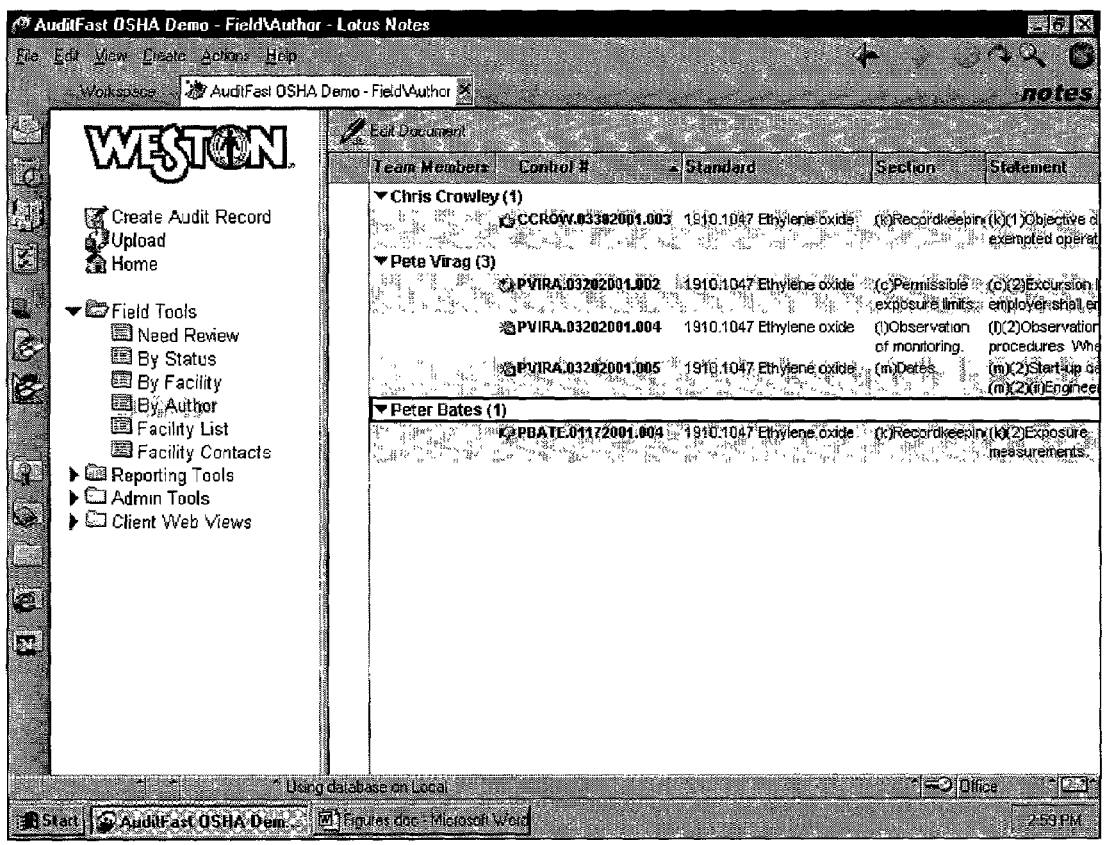
Figure 4G:
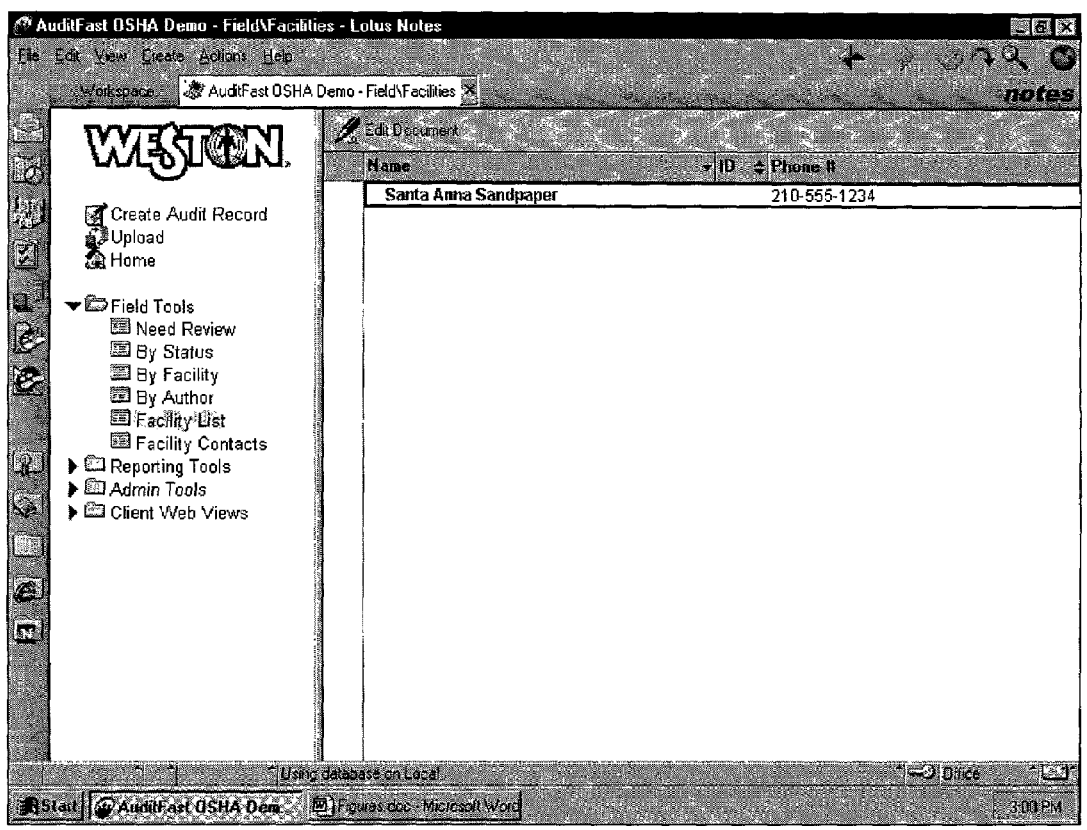
Figure 4H:
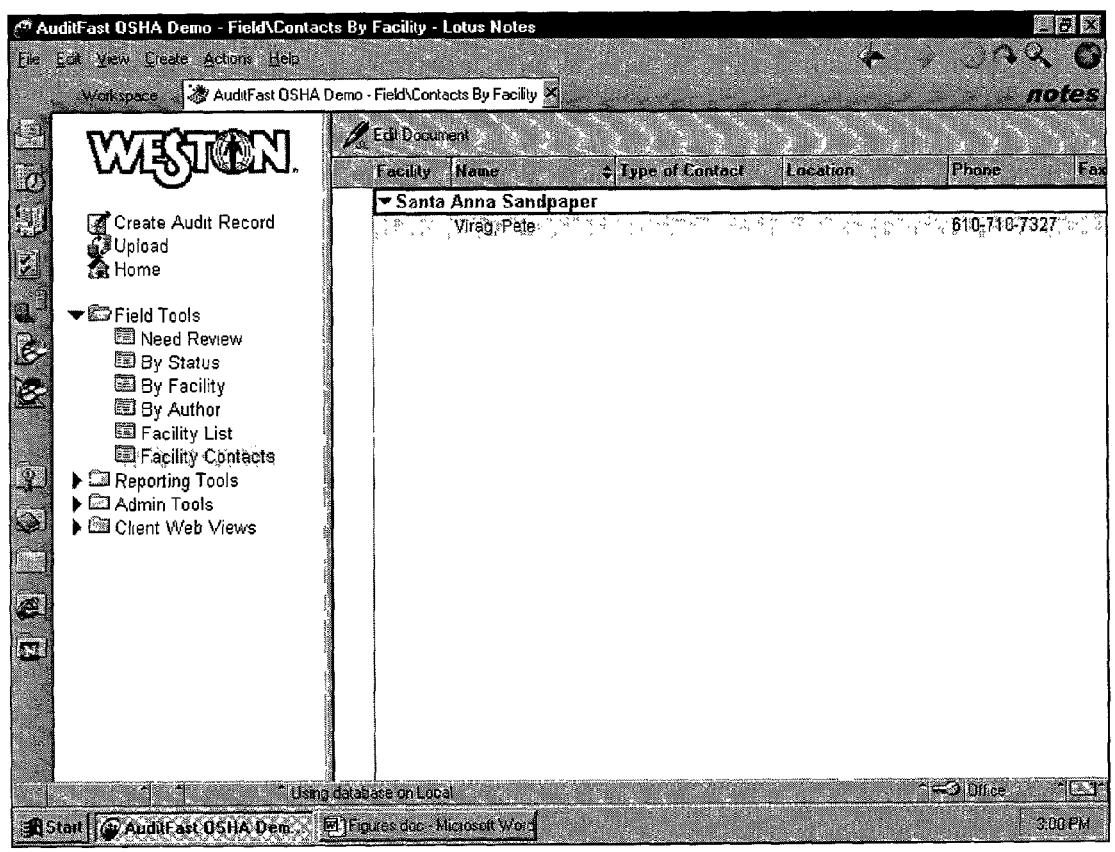

FIG. 3 is a computer screen shot of the home page of the preferred embodiment of the software application of the system of the present invention. As shown in FIG. 3, the software application of the system of the present invention preferably includes a set of field tools, reporting tools, administrative tools, and client web views. These will be described in more detail below. The home page of the system of the present invention may also preferably include active buttons for performing some of the more important tasks of the software application of the system of the present invention, including Create Audit Record, Add New Facility, and Add New Contact. The homepage may also preferably include active buttons for viewing records needing review and reviewing records listed by their status.

The field tools of the system of the present invention will now be described in more detail in regard to FIGS. 4(*a*)–(*h*). As shown in FIG. 4(*a*), the field tools may preferably include an active link to access all of the relevant audit records in data storage 6 that need to be reviewed by quality assurance personnel for approval or comment. The relevant audit records in data storage 6 can also be retrieved by status, by facility, by the author (e.g. the inspector inputting the audit information into data storage 6), by the particular facility, or by the designated contact at the facility. Of course, it would be appreciated to those of ordinary skill in the art that the manner of retrieving the relevant audit records from data storage 6 is not particularly limited to the aforementioned criteria.

As shown in FIG. 4(*b*), when the quality assurance personnel selects the Need Review link on the client application running on computer 7, server 5 accesses data storage 6 in a conventional manner and retrieves the audit records in the designated audit that need review by that quality assurance person. Access to various audits and audit records can be restricted through a multi-tier system of user access permissions. For example, a particular reviewer may only have access to certain ongoing audits, or may only be able to review information inputted into the system by a particular inspector under that reviewer's supervision.

As shown in FIG. 4(*c*), by selecting that link, the user is able to retrieve audit records by their status. In the example shown in FIG. 4(*c*), the status used are Not Accepted, Accepted, Resubmitted, and New. Not Accepted in this preferred embodiment of the system of the present invention refers to audit records which have previously been reviewed by the quality assurance personnel, but not deemed acceptable. In this prior review, the quality assurance person may have submitted comments back to the inspector, as described in more detail below.

Records which are deemed Accepted, of course, have been deemed acceptable by the reviewer. Resubmitted records are records for which the investigator has received comments back from the quality assurance personnel (or simply a rejection or non-acceptance of the record) and has updated and resubmitted that audit record to the system for further review. New records are records that have recently been inputted by the inspector, but which have not yet been reviewed by the quality assurance personnel.

The audit records are preferably presented in a summary list form providing relevant information, such as the aforementioned status, the control number, (or ID number) of the particular record in the system, the regulatory standard (protocol) which prompted the creation of this audit record, and statements or comments elaborating upon the particular record. The full content of the audit record may be accessed by double-clicking on the record summary or by some similar means known by those of ordinary skill in the art.

FIG. 4(*d*) is an illustration of a complete audit record of the system of the present invention. While the format and information contained in the audit record is not particularly limited, in the preferred embodiment shown in FIG. 4(*d*) the audit record includes the aforementioned record ID number or control number, the facility information, the date of the audit, and the audit team involved in preparing the audit.

More particularly, the audit record preferably contains a detailed set of fields correlated to the environmental regulations, rules, and provisions that are controlling for the audit. For example, such safety regulations may include the regulations and rules enforced by OSHA, as previously mentioned. These rules and regulations are also preferably stored in data storage 6 and integrated into the creation and updating of audit records, such as through the use of a series of drop down boxes and drill down menus included in the client application operating on computer 7. Each audit record has a particular safety rule or regulation associated with it which distinguishes that audit record for the particular audit and for that particular safety criteria.

FIG. 4(*e*) illustrates the retrieval of audit records by facility. As can be seen in FIG. 4(*e*), the audit records are retrieved in the form of a hierarchical, expandable list, categorized, in this case, by facility. This hierarchical expandable structure is preferably applied to all of the methods of retrieving audit records so that the user can quickly and easily review the audit records to find the information they are seeking. FIG. 4(f) illustrates the same retrieval process, except this time by author. FIGS. 3(g) and 3(h) illustrate retrievals of the facility list and facility contacts, respectively. Once again, these audit records are provided in the same convenient hierarchical, expandable list.

Figure 5A:
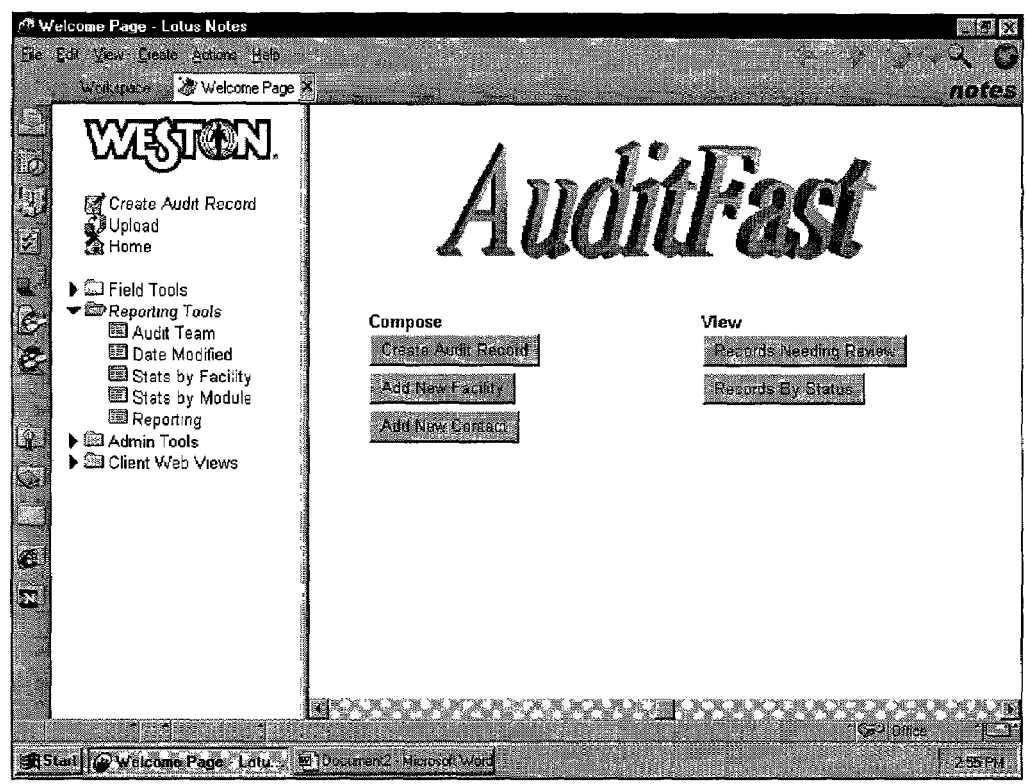
FIGS. 5(a)–(f) are computer screen shots of the preferred embodiment of the reporting tools of the system of the present invention accessed through the client application.
Figure 5B:
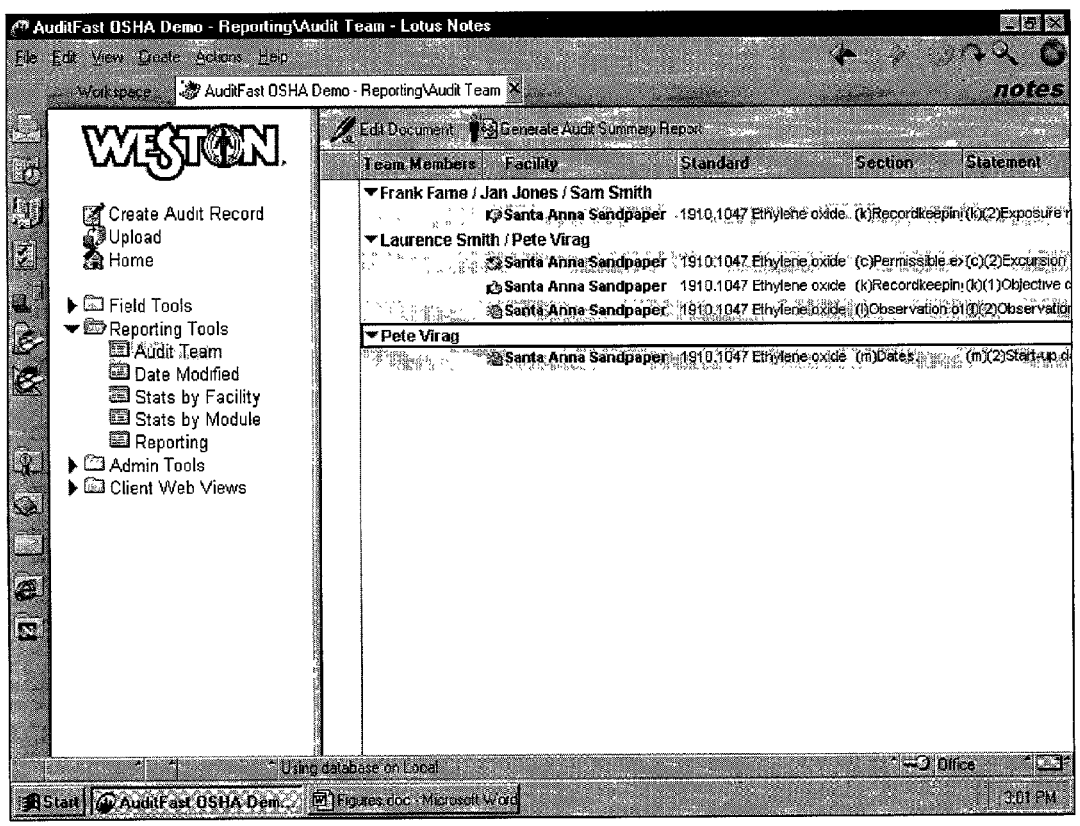
Figure 5C:
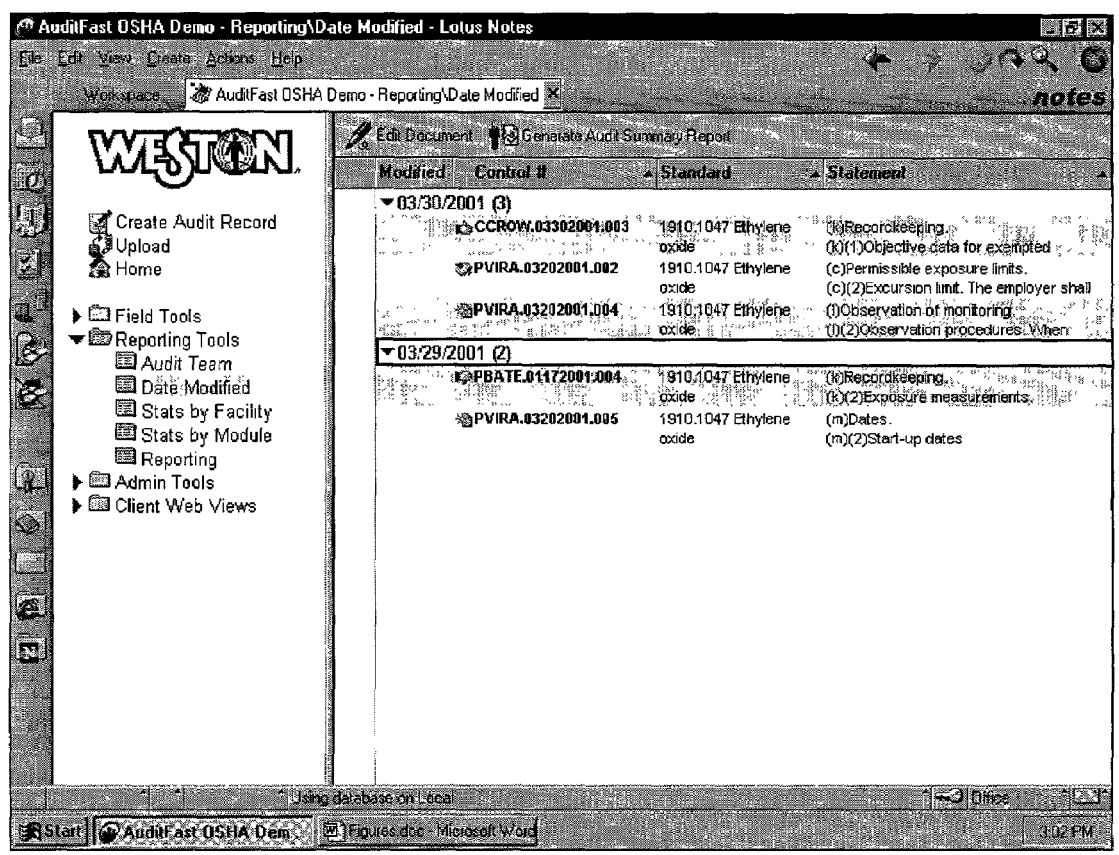
Figure 5D:
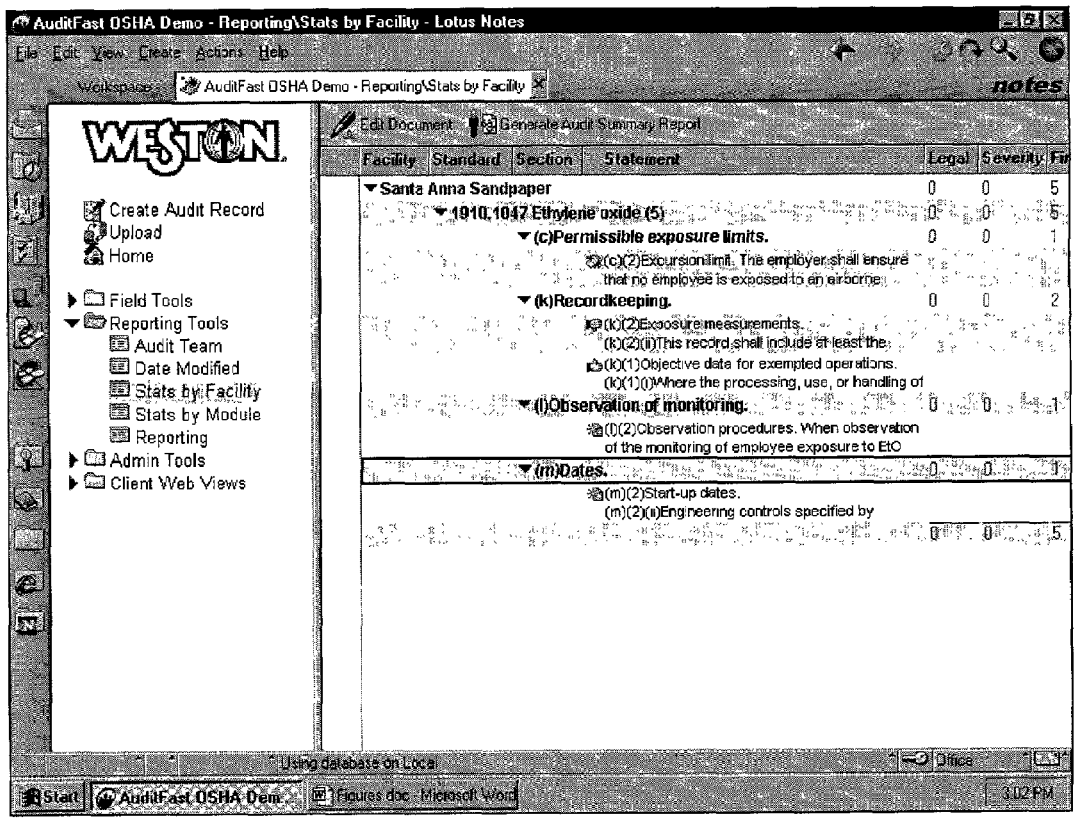
Figure 5E:
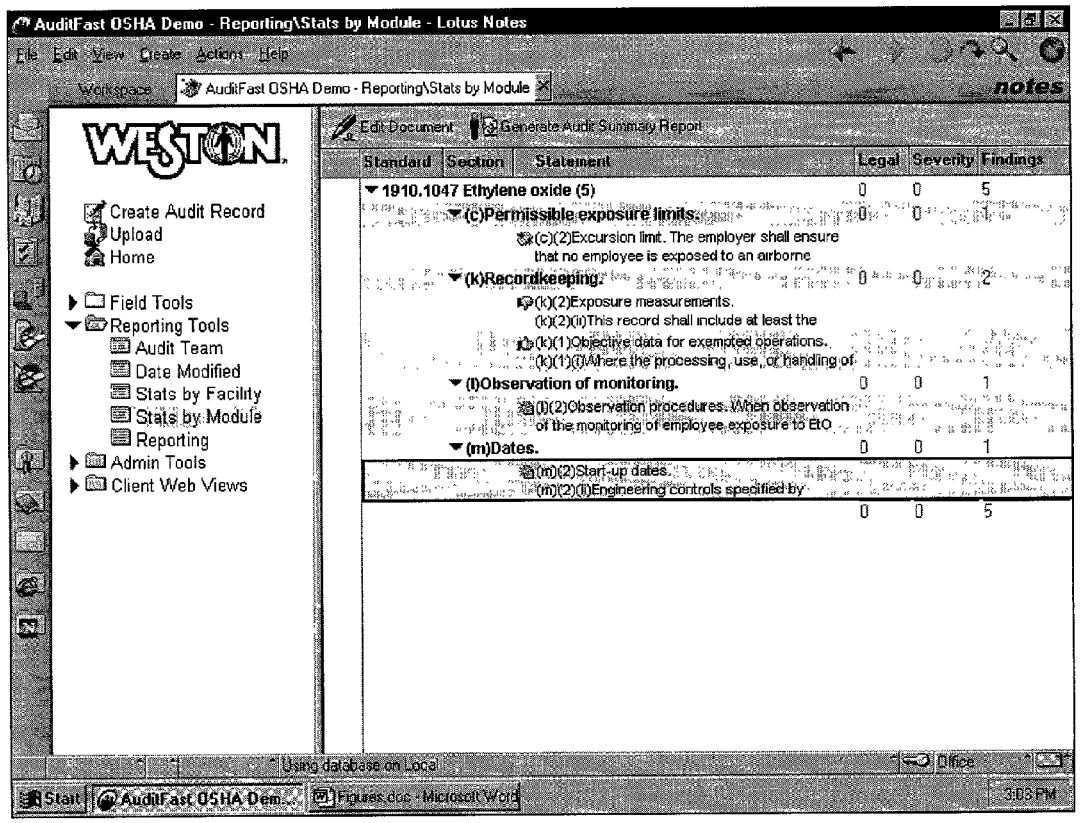
Figure 5F:
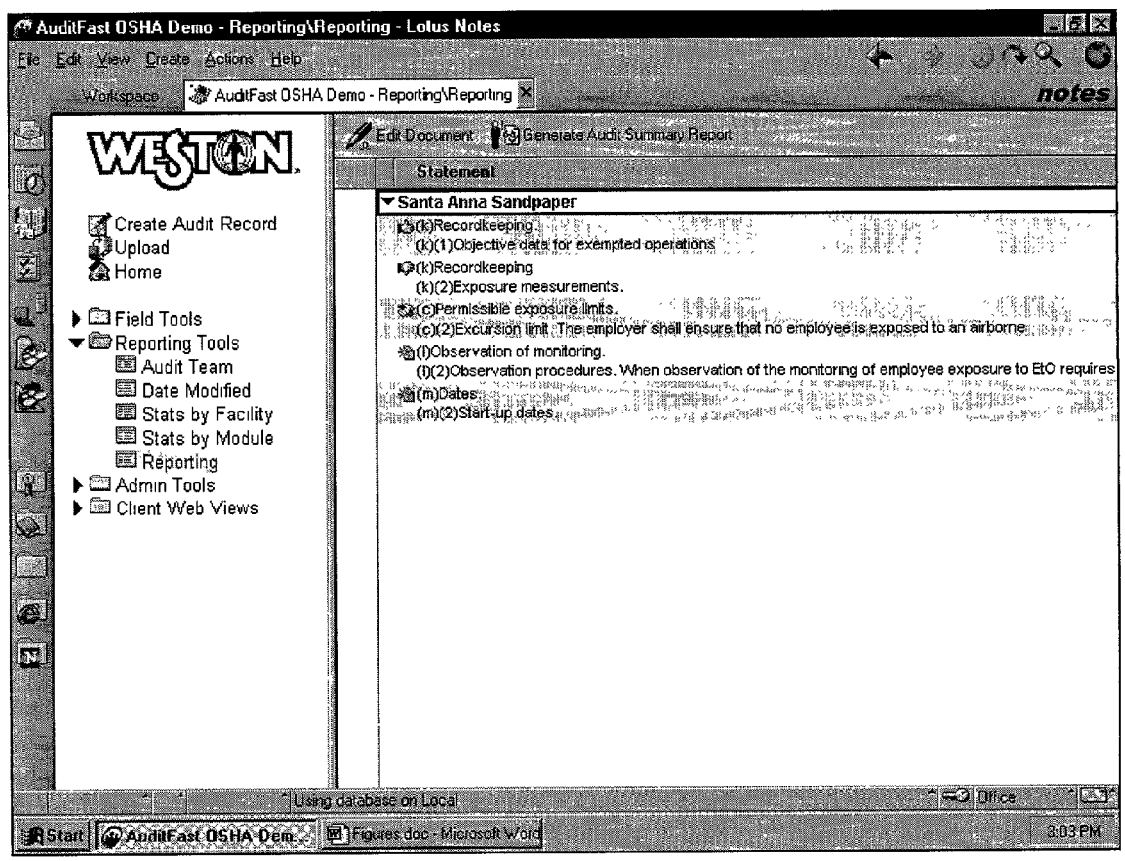

FIG. 5(a) illustrates the preferred reporting tools of the system of the present invention. One of ordinary skill in the art will appreciate that the reporting tools are not limited thereto. These reporting tools allow audit records to be retrieved so that audit summary reports can be produced. The reporting tools preferably allow for audit records to be retrieved by the audit team conducting the audit, the date the records were modified, statistics by facility, and statistics by module, as illustrated in FIGS. 5(c)–(f).

As shown in FIGS. 5(a)–(f), an audit summary report can be generated by clicking on the appropriate link in the client application. When this link is activated, the application on server 5 retrieves the associated audit record report information from data storage 6 and generates a printable report which is returned to the client application on computer 7.

The form of this report is not particularly limited, and can be produced by one of any number of systems well known to those of ordinary skill in the art, such as Microsoft Word, Corel WordPerfect, and the like. If the system of the present invention is being operated over the Internet, for example, the report may also preferably be provided in the form of an HTML based web page, or a PDF file.

Figure 6:
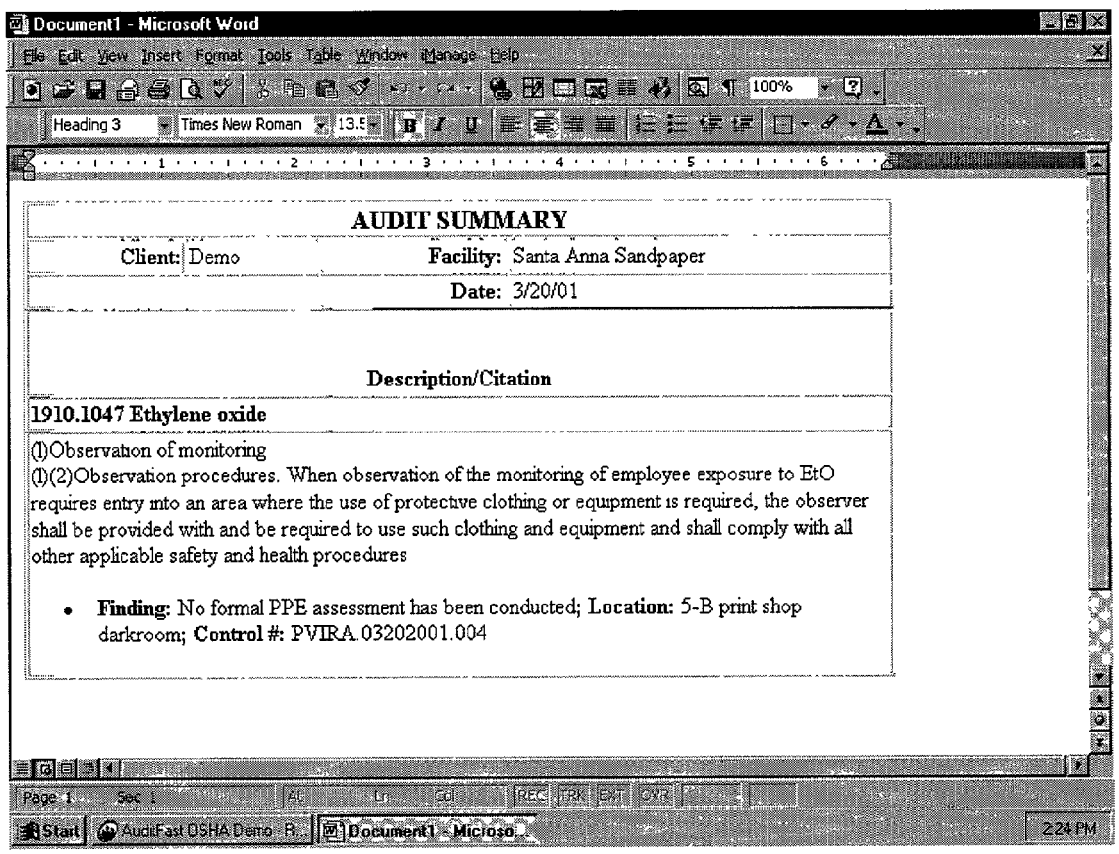
FIG. 6 is a computer screen shot of a preferred embodiment of an audit summary report in accordance with the system of the present invention.

An example of an audit summary report in the preferred embodiment of the present invention is shown in FIG. 6. As shown in FIG. 6, the audit summary report includes a formatted version of the selected audit record information included in the report.

Figure 7A:
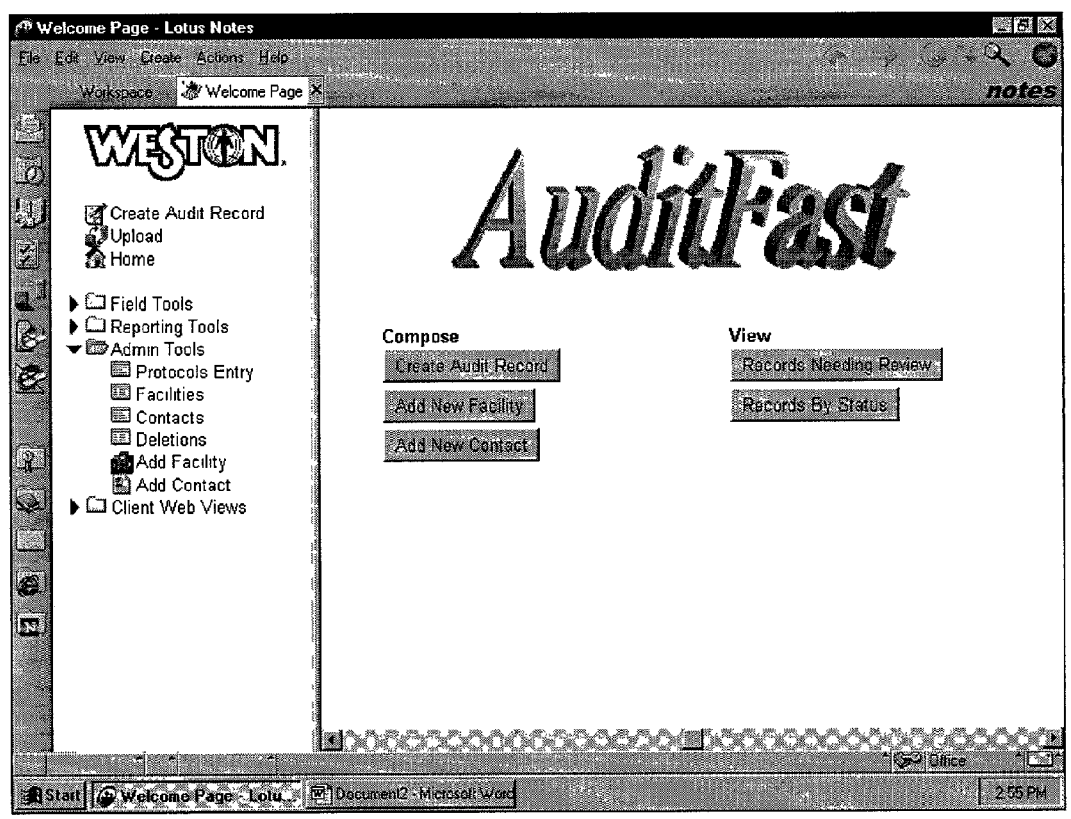
FIGS. 7(a)–(h) are computer screen shots of the preferred embodiment of the administrative tools of the system of the present invention operated over a client application.

FIGS. 7(a)–(f) illustrate the preferred embodiment of the administrative tools of the system of the present invention. As can be seen in FIG. 7(a), the administrative tools preferably include the ability to enter, update, and modify protocols, facilities, and contacts; and also the ability to delete these entries.

Figure 7B:
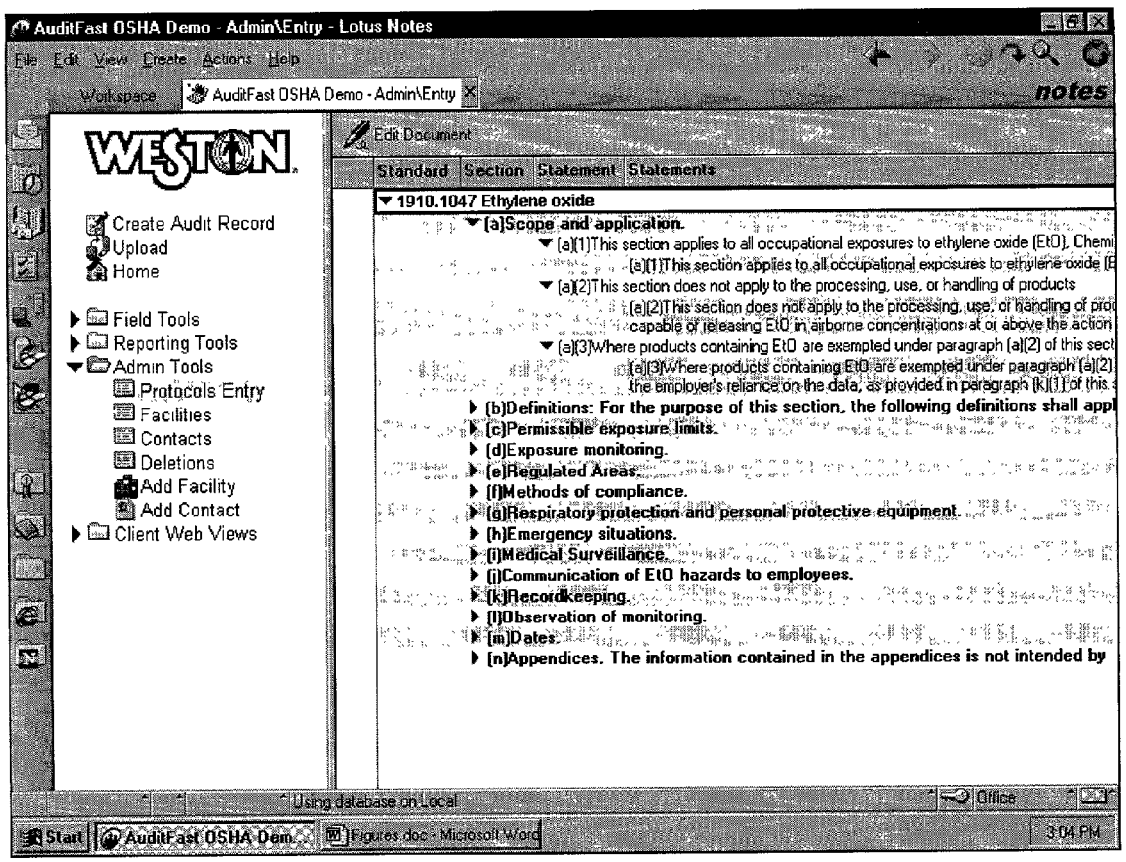

FIG. 7(b) illustrates the manner in which protocols may be entered into the system. As shown in FIG. 7(b), by clicking on the protocol entry link, a list of the relevant protocols (i.e. safety rules and regulations of the system of the present invention), are retrieved and displayed in a hierarchical, expandable manner. Protocol information may be entered and updated by highlighting and clicking on the particular protocol in question.

Figure 7C:
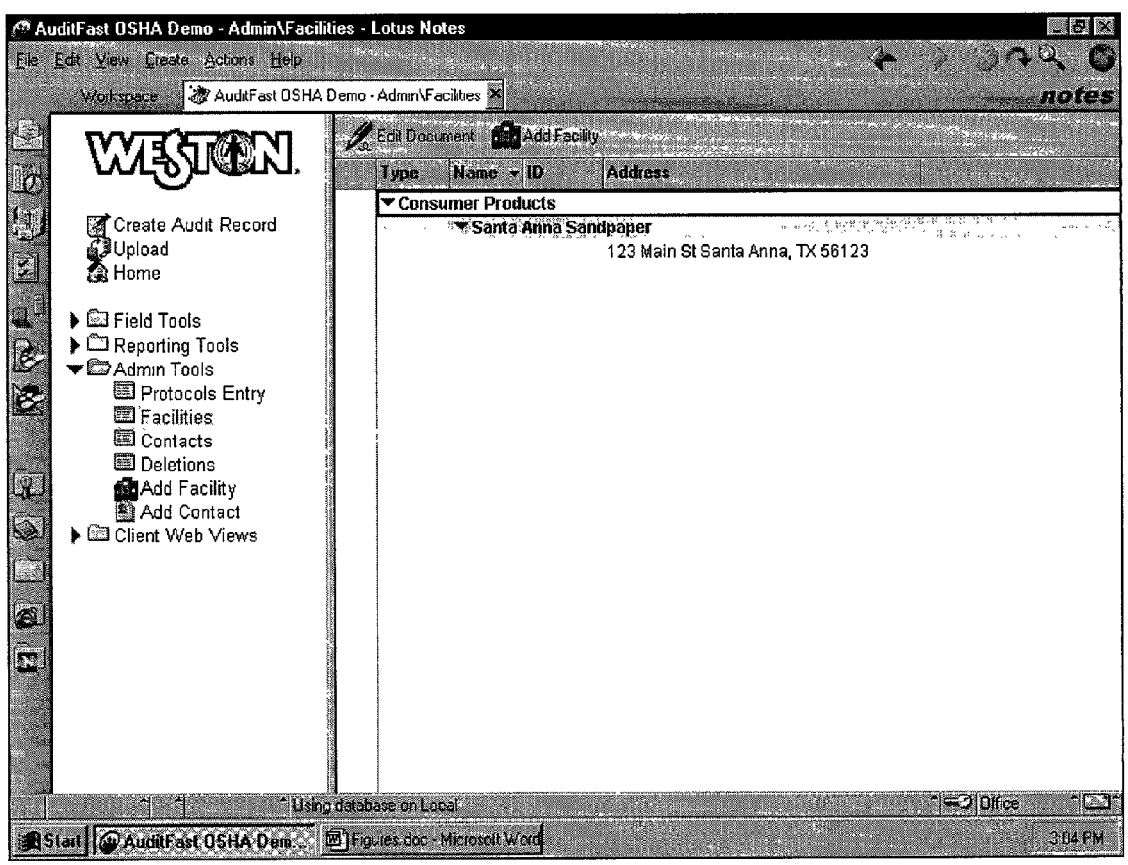
Figure 7D:
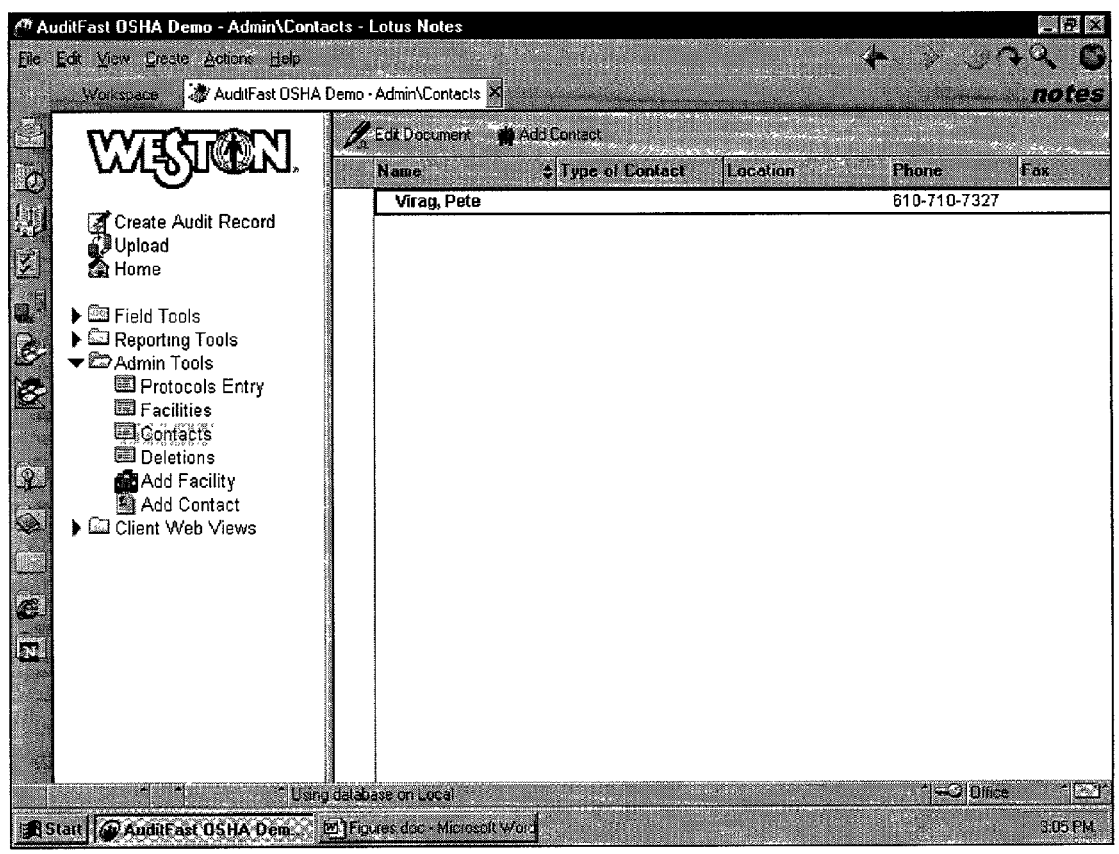
Figure 7E:
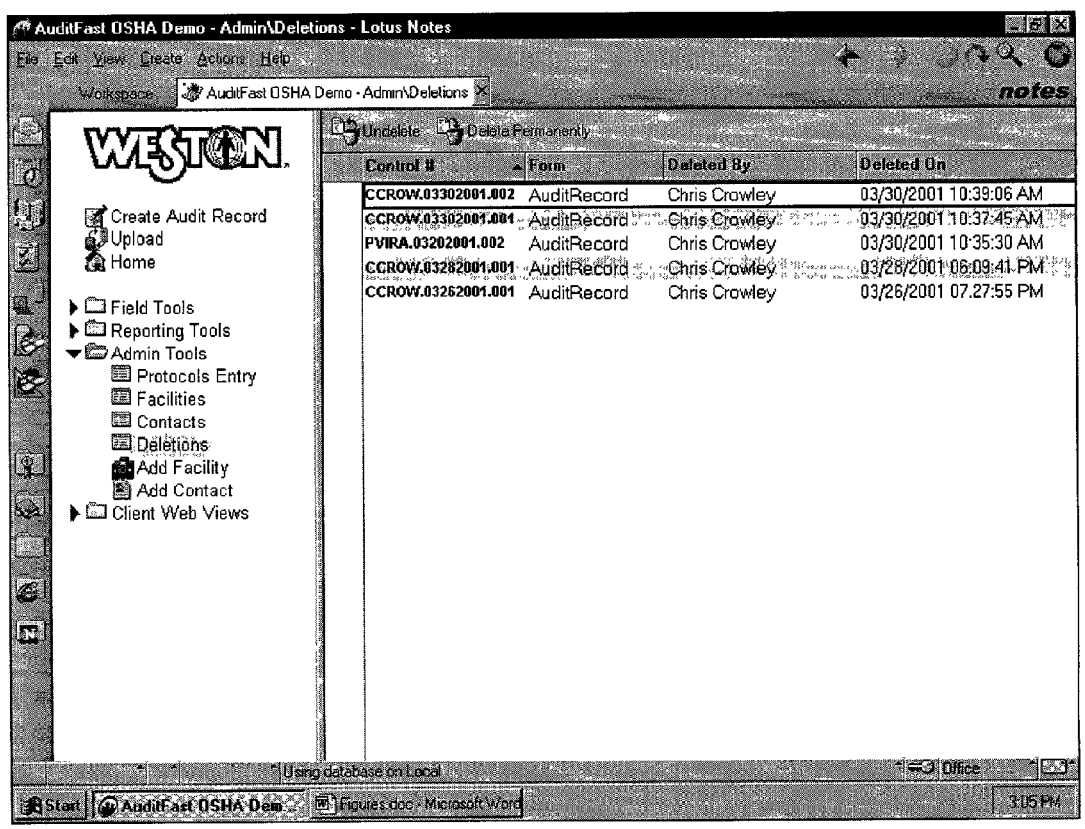
Figure 7F:
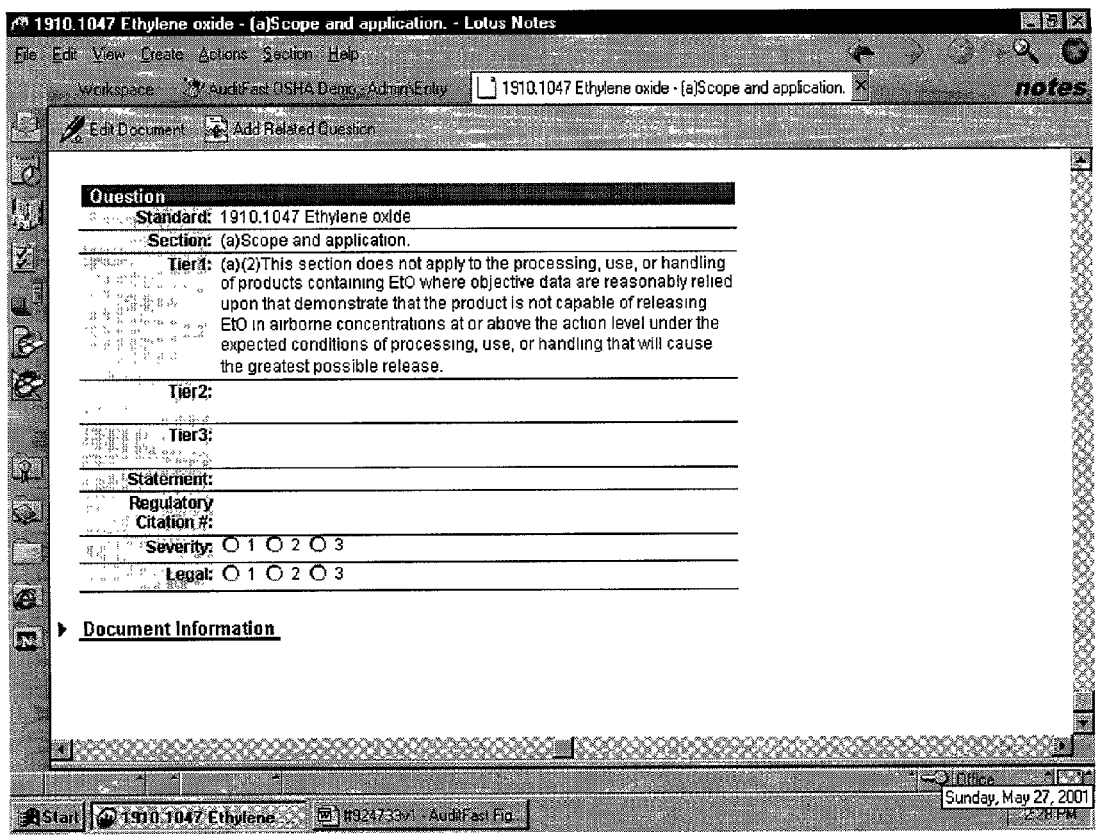

An example of the protocol information stored in the system of the present invention to be used in connection with the audit records is shown in FIG. 7(f). As shown in FIG. 7(f), the particular standard, section, and plurality of tiers are preferably included. These correspond to the particular regulatory section, subsection, and subparts to which the protocol relates. Statements or comments about the protocol may also be included for further explanation or clarification. Also, the particular regulatory citation number corresponding to the rule or regulation may also be included. This provides the significant advantage that rules and regulations can be indexed and searched quickly and accurately, and also allows for associated audit records to be similarly indexed and searched.

The severity of the rule may also be indicated, as well as the legal import. For example, statutes have a greater legal import than regulations, which are in turn more legally significant than rules, or guidelines. Similarly, a protocol may be a requirement, a simple preference, or a mere option. Information about the protocol document may also be included, such as who created the protocol record, who last edited the protocol record, and when these events took place.

Similarly, as shown in FIG. 7(c), the information for different facilities being audited can also be retrieved and updated. Once the facilities have been retrieved by clicking on the facilities link, a particular facility record may be updated by clicking thereon.

Figure 7G:
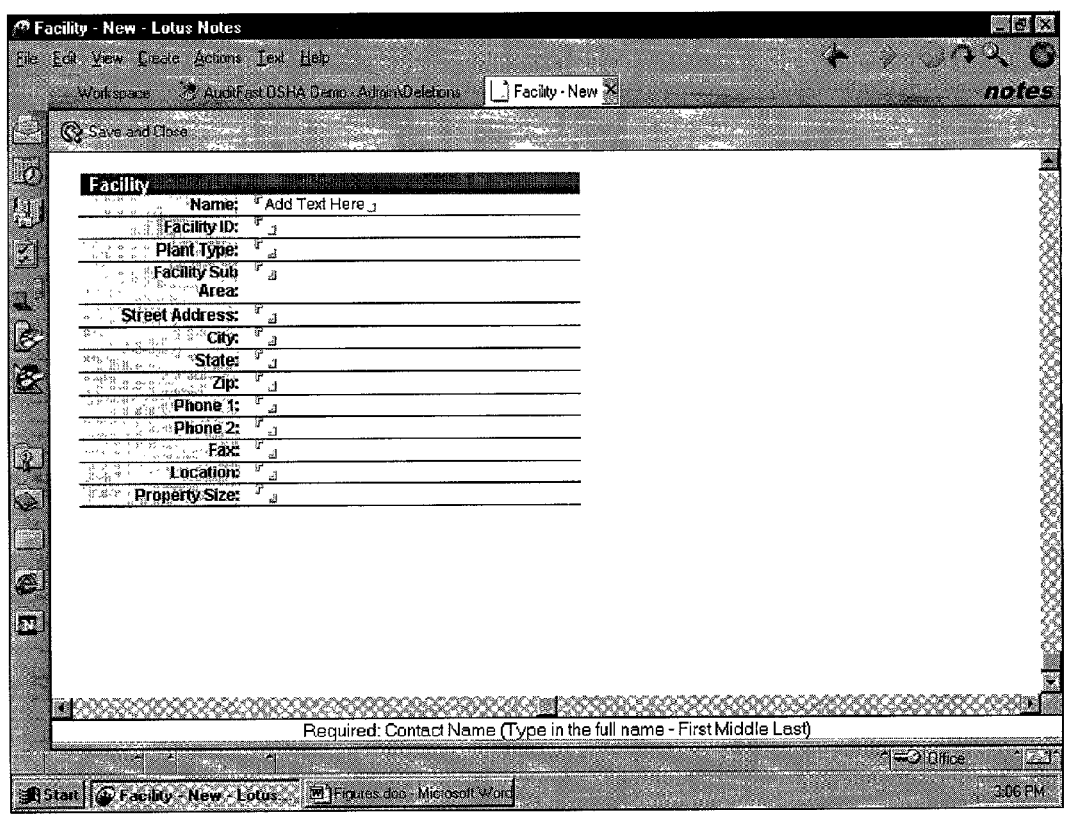

An example of a facility record of the preferred embodiment of the system of the present invention is shown in FIG. 7(g). As shown in FIG. 7(g), the facility information may contain a facility ID number for accurate indexing of the information, the name of the facility, the type of facility, the location of the facility, and contact information. Of course, one of ordinary skill in the art will appreciate that the particular facility information to be included is not limited to the embodiment shown herein, and can include a variety of other facility related information.

Figure 7H:
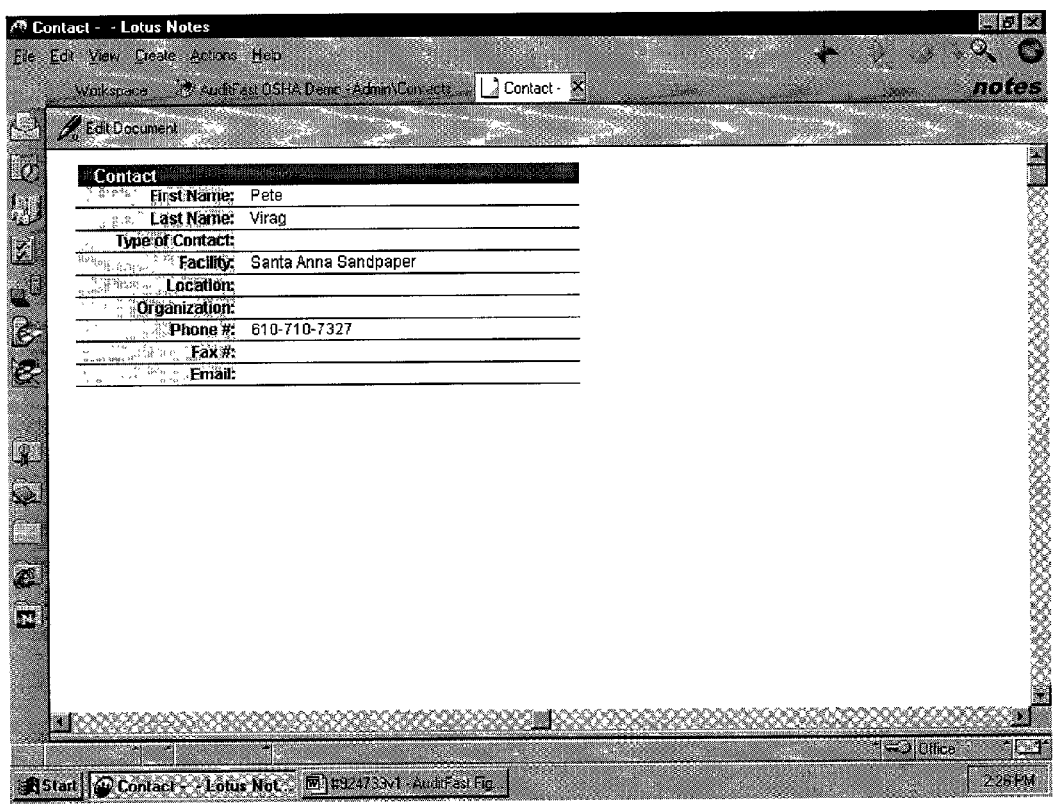
Figure 8A:
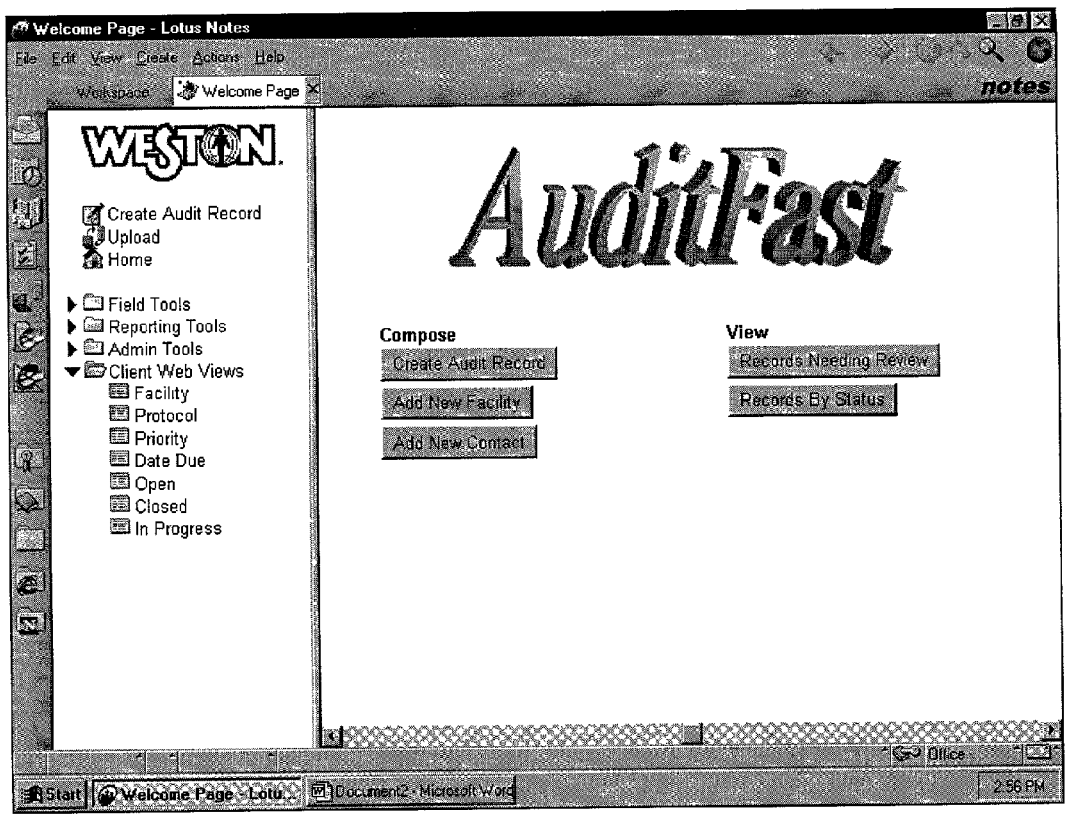
FIGS. 8(a)–(f) are computer screen shots of a preferred embodiment of the client web views of the system of the present invention operated over a client application.
Figure 8B:
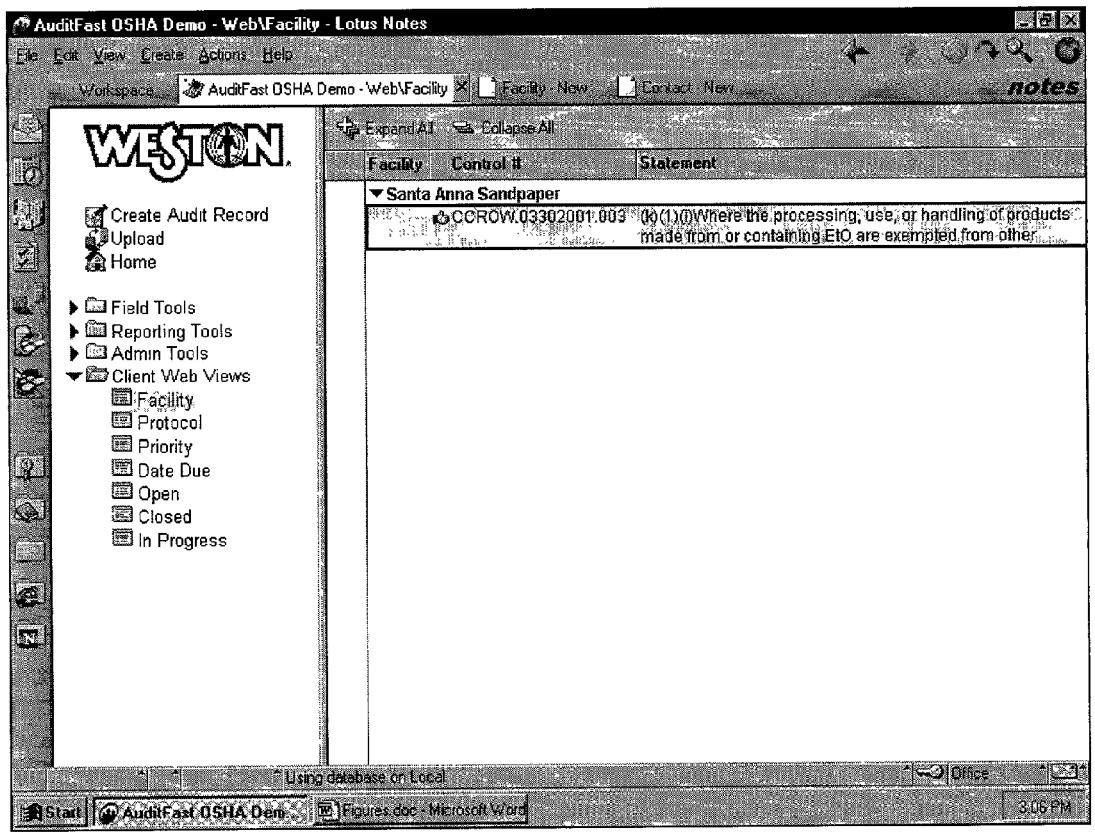
Figure 8C:
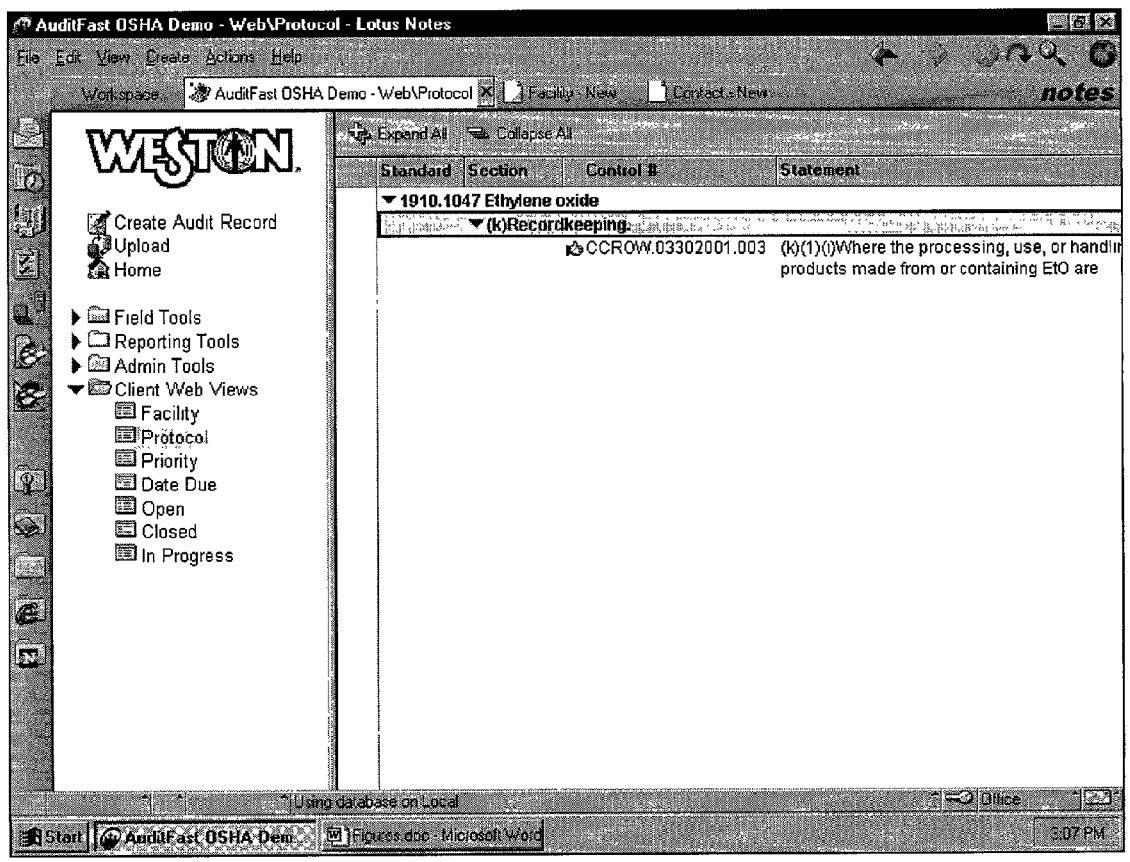
Figure 8D:
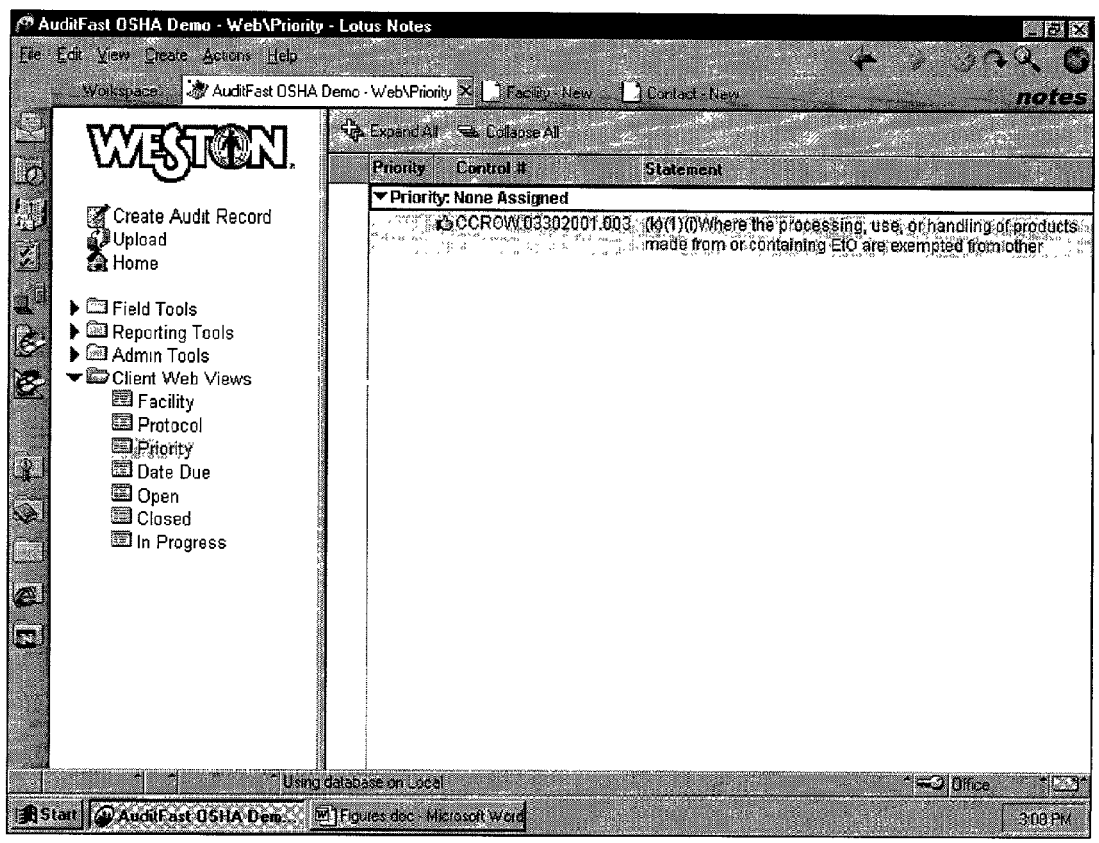
Figure 8E:
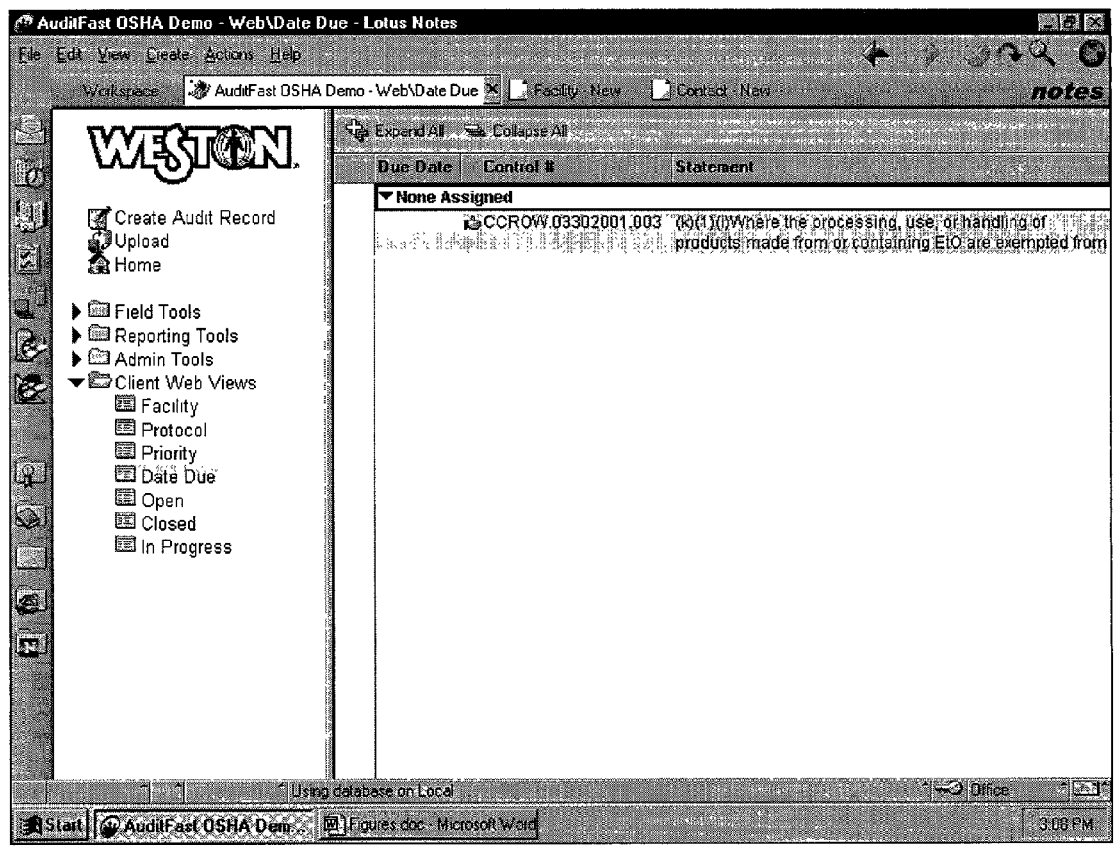
Figure 8F:
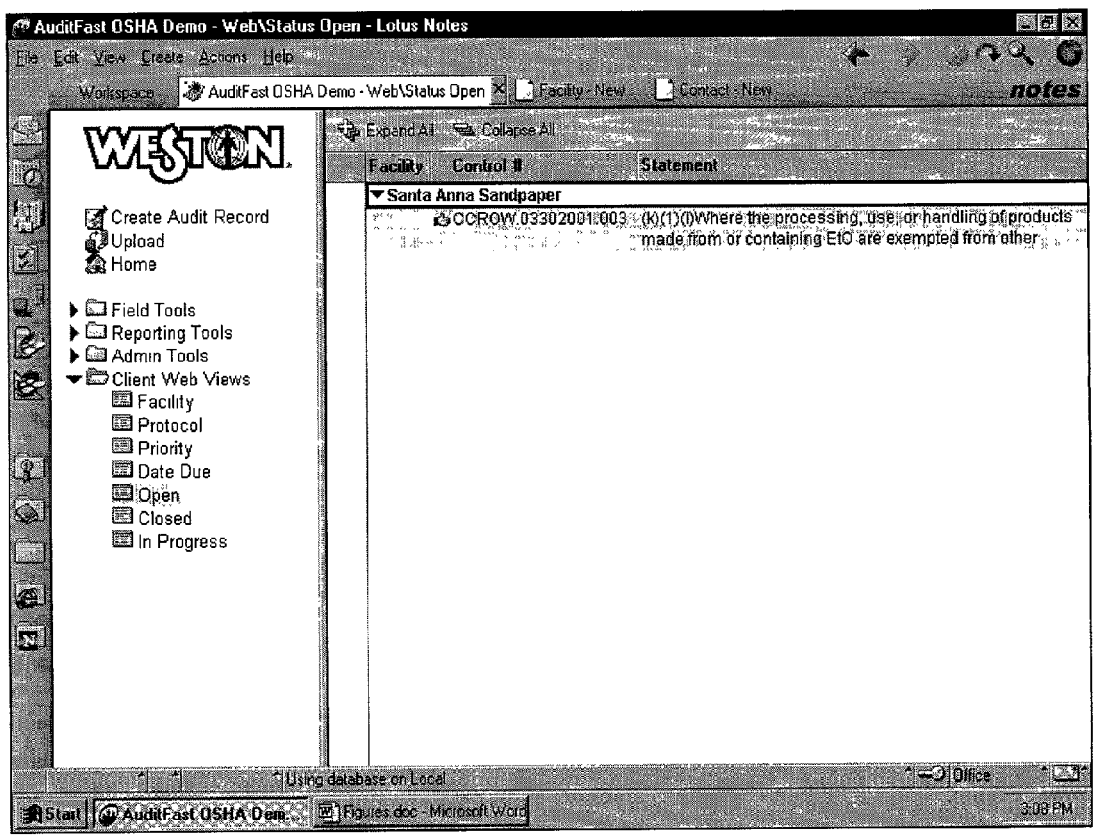

The retrieval of contact information may occur in a similar manner as shown in FIG. 7(d). An example of a contact record is shown in FIG. 7(h), and can include information along the same lines as the facility information, such as an ID number, name, and contacting information.

Records which have been deleted, but not permanently deleted can be viewed by clicking on the deletions link in the administrative tools, as shown in FIG. 7(e). The particular information for the audit record can be accessed by clicking on the record in question. This retrieves the audit record information described above. The deletion portion of the client application of the system of the present invention also preferably includes the ability to permanently delete records from the system, after which time they will no longer be accessible.

All of the aforementioned functionality of the system of the present invention may be accessed using a client application operating on computer 7 working in conjunction with a server application resident and operating on server 5 to access data storage 6. However, the present invention also provides the ability to perform the same functionality using a web browser operating over the internet. The client web views are illustrated in FIGS. 8(a)–(f). Using a web browser, the user operating at computer 7 may access the system of the present invention to review facility information and protocol information in the manner described above.

In addition, the user may review audit information by a designated priority, the date the audit record information is to be completed. The user may also view which audit records and audits are currently opened and which are closed and the level of progress of each.

The ability to enter, view, review, and updated and modify the audit, audit record, facility, and contact information stored in the system of the present invention may be restricted through the use of multiple layers of user access permissions. For example, the inspector who is creating an audit record may only have the ability to enter audit record information in a predetermined set of protocols at a predetermined number of facilities for which he or she is given access. In contrast, a quality assurance reviewer may only be allowed to review audit records from one or more particular inspectors, or from particular facilities or based upon particular protocols for which that quality assurance personnel has particular experience. The creation and updating of protocols and establishment of the facilities to be audited and the audit records to be imputed based upon the protocols may be restricted to administrative personnel only, or some overseeing supervisor to the quality assurance personnel and the inspector. Of course, these are only examples of the way in which user access may be restricted.

Although this invention has been described with reference to particular embodiments, it will be appreciated that many variations may be resorted to without departing from the spirit and scope of the invention. For example, although the preferred embodiment of the invention was described in connection with the software application Lotus Notes, it is certainly not limited thereto and may be implemented with any interactive data storage and retrieval application. Moreover, the system may be operated over a public network such as the Internet, or over a virtual private network or local network system.

We claim:

1. A method for managing environmental audit information comprising the steps of:
   receiving environmental audit information;
   accessing a predetermined set of environmental audit protocols;
   associating said audit information with at least one of said environmental audit protocols to form an environmental audit record;
   storing said environmental audit record; and
   accessing an audit summary report.

2. The method of claim 1, further comprising the step of restricting access to said environmental audit record so that a quality assurance reviewer can access said environmental audit record and can add comments to said environmental audit record, but cannot otherwise modify said environmental audit record.

3. The method of claim 2, further comprising the step of enabling said quality assurance reviewer to designate the review status of said environmental audit record.

4. The method of claim 1, further comprising the step of providing notification of said environmental audit record.

5. The method of claim 1, further comprising the step of associating one or more of said environmental audit records to form an audit log.

6. The method of claim 1, wherein a plurality of environmental audit records are stored for a plurality of different facilities.

7. The method of claim 1, wherein a plurality of environmental audit records are stored for a plurality of contacts.

8. The method of claim 1, further comprising the step of providing access to said environmental audit records via a hierarchical, expandable list.

9. The method of claim 1, wherein said environmental audit record includes one or more types of information selected from the group consisting of a facility, a contact, an author, an audit team, record dates, who created the audit record, who last edited the audit record, and comments.

10. The method of claim 1, further comprising the step of providing for the retrieval of said environmental audit records indexed by one or more selected from the group consisting of a facility, a contact, an author, an audit team, record dates, who created the audit record, who last edited the audit record, and comments.

11. The method of claim 1, further comprising the step of providing administrator access to said environmental audit records to interview, review, update, and modify said environmental audit record.

12. The method of claim 1, wherein said set of environmental audit protocols comprise safety regulations maintained by OSHA.

13. A method for managing environmental audit information comprising the steps of:
    receiving environmental audit information;
    accessing a predetermined set of environmental audit protocols;
    associating said audit information with at least one of said environmental audit protocols to form an environmental audit record;
    storing said environmental audit record;
    restricting access to said environmental audit record so that a quality assurance reviewer can access said environmental audit record and can add comments to said environmental audit record, but cannot otherwise modify said environmental audit record; and
    accessing an audit summary report.

14. The method of claim 13, further comprising the step of enabling said quality assurance reviewer to designate the review status of said environmental audit record.

15. The method of claim 13, further comprising the step of providing notification of said environmental audit record.

16. The method of claim 13, further comprising the step of associating one or more of said environmental audit records to form an audit log.

17. The method of claim 13, wherein a plurality of environmental audit records are stored for a plurality of different facilities.

18. The method of claim 13, wherein a plurality of environmental audit records are stored for a plurality of contacts.

19. The method of claim 13, further comprising the step of providing access to said environmental audit records via a hierarchical, expandable list.

20. The method of claim 13, wherein said environmental audit record includes one or more types of information selected from the group consisting of a facility, a contact, an author, an audit team, record dates, who created the audit record, who last edited the audit record, and comments.

21. The method of claim 20, further comprising the step of providing for the retrieval of said environmental audit records indexed by one or more selected from the group consisting of a facility, a contact, an author, an audit team, record dates, who created the audit record, who last edited the audit record, and comments.

22. The method of claim 13, further comprising the step of providing administrator access to said environmental audit records to interview, review, update, and modify said environmental audit record.

23. The method of claim 13, wherein said set of environmental audit protocols comprise safety regulations maintained by OSHA.

24. A system for managing environmental audit information comprising:
    a user interface for receiving environmental audit information;
    a data source interface programmed to access a predetermined set of environmental audit protocols and to associate said audit information with at least one of said environmental audit protocols to form an environmental audit record;
    a data source in communication with said data source interface for storing said environmental audit record; and
    a data source for accessing an audit summary report.

25. The system of claim 24, wherein said data source interface is programmed to restrict access to said environmental audit record so that a quality assurance reviewer can access said environmental audit record and can add comments to said environmental audit record, but cannot otherwise modify said environmental audit record.

26. The system of claim 24, wherein said data source interface is further programmed said quality assurance reviewer to designate the review status of said environmental audit record.

27. The system of claim 24, further comprising the step of providing notification of said environmental audit record.

28. The system of claim 24, wherein said data source interface is further programmed to associate one or more of said environmental audit records to form an audit log.

29. The system of claim 24, wherein a plurality of audit records are stored for a plurality of different facilities.

30. The system of claim 24, wherein a plurality of audit records are stored for a plurality of contacts.

31. The system of claim 24, wherein said data source interface is further programmed to provide access to said audit records via a hierarchical expandable list.

32. The system of claim 24, wherein said environmental audit record includes one or more types of information selected from the group consisting of a facility, a contact, an author, an audit team, record dates, who created the audit record, who last edited the audit record, and comments.

33. The system of claim 32, wherein said data source interface is further programmed to provide for the retrieval of said audit records indexed by one or more selected from the group consisting of a facility, a contact, an author, an audit team, record dates, who created the audit record, who last edited the audit record, and comments.

34. The system of claim 24, wherein said data source interface is further programmed to provide administrator access to said audit records to interview, review, update, and modify said environmental audit record.

35. The system of claim 24, wherein said environmental audit protocol includes environmental regulations maintained by OSHA.

36. A system for managing environmental audit information comprising:
a user interface for receiving environmental audit information;
a data source interface programmed to access a predetermined set of environmental audit protocols and to associate said audit information with at least one of said environmental audit protocols to form an environmental audit record;
a data source in communication with said data source interface for storing said environmental audit record wherein said data source interface is programmed to restrict access to said environmental audit record so that a quality assurance reviewer can access said environmental audit record and can add comments to said environmental audit record, but cannot otherwise modify said environmental audit record; and
a data source for accessing an audit summary report.

37. The system of claim 36, wherein said data source interface is further programmed for said quality assurance reviewer to designate the review status of said environmental audit record.

38. The system of claim 36, further comprising the step of providing notification of said environmental audit record.

39. The system of claim 36, wherein said data source interface is further programmed to associate one or more of said environmental audit records to form an audit log.

40. The system of claim 36, wherein a plurality of audit records are stored for a plurality of different facilities.

41. The system of claim 36, wherein a plurality of audit records are stored for a plurality of contacts.

42. The system of claim 36, wherein said data source interface is further programmed to provide access to said audit records via a hierarchical expandable list.

43. The system of claim 36, wherein said environmental audit record includes one or more types of information selected from the group consisting of a facility, a contact, an author, an audit team, record dates, who created the audit record, who last edited the audit record, and comments.

44. The system of claim 43, wherein said data source interface is further programmed to provide for the retrieval of said audit records indexed by one or more selected from the group consisting of a facility, a contact, an author, an audit team, record dates, who created the audit record, who last edited the audit record, and comments.

45. The system of claim 36, wherein said data source interface is further programmed to provide administrator access to said audit records to interview, review, update, and modify said environmental audit record.

46. The system of claim 36, wherein said environmental audit protocol includes environmental regulations maintained by OSHA.

47. A method for managing environmental audit information comprising the steps of:
receiving environmental audit information;
accessing a predetermined set of environmental audit protocols;
associating said audit information with at least one of said environmental audit protocols to form an environmental audit record;
storing said environmental audit record;
restricting access to said environmental audit record so that a quality assurance reviewer can access said environmental audit record, but cannot otherwise modify said environmental audit record; and
accessing an audit summary report.

48. The method of claim 47, wherein a plurality of environmental audit records are stored.

49. The method of claim 48, wherein a quality assurance reviewer can access and modify at least one of said environmental audit records, but cannot access or modify others of said environmental audit records.

50. A system for managing environmental audit information comprising:
a user interface for receiving environmental audit information;
a data source interface programmed to access a predetermined set of environmental audit protocols and to associate said audit information with at least one of said environmental audit protocols to form an environmental audit record;
a data source in communication with said data source interface for storing said environmental audit record wherein said data source interface is programmed to restrict access to said environmental audit record so that a quality assurance reviewer can access said environmental audit record, but cannot otherwise modify said environmental audit record; and
a data source for accessing an audit summary report.

51. The system of claim 50, wherein a plurality of audit records are stored.

52. The system of claim 51, wherein a quality assurance reviewer can access and modify at least one of said environmental audit records, but cannot access or modify others of said environmental audit records.

* * * * *